(12) United States Patent
Iizuka et al.

(10) Patent No.: US 12,452,559 B2
(45) Date of Patent: Oct. 21, 2025

(54) SOLID-STATE IMAGE SENSOR, IMAGING DEVICE, AND AD CONVERTER

(71) Applicant: RENESAS ELECTRONICS CORPORATION, Tokyo (JP)

(72) Inventors: Yoichi Iizuka, Tokyo (JP); Fukashi Morishita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 243 days.

(21) Appl. No.: 18/319,152

(22) Filed: May 17, 2023

(65) Prior Publication Data
US 2023/0412947 A1   Dec. 21, 2023

(30) Foreign Application Priority Data

Jun. 20, 2022   (JP) .................. 2022-098938

(51) Int. Cl.
*H04N 25/77* (2023.01)
*H04N 25/772* (2023.01)
(52) U.S. Cl.
CPC ................. *H04N 25/772* (2023.01)
(58) Field of Classification Search
CPC ................................................. H04N 25/772
See application file for complete search history.

(56) References Cited

U.S. PATENT DOCUMENTS

2020/0260039 A1* 8/2020 Niwa .................. H04N 25/772

FOREIGN PATENT DOCUMENTS

JP   2008-092091 A   4/2008

* cited by examiner

*Primary Examiner* — Lin Ye
*Assistant Examiner* — Fayez A Bhuiyan
(74) *Attorney, Agent, or Firm* — Rimon P.C.

(57) ABSTRACT

A solid-state image sensor includes a buffer circuit, and an AD conversion circuit. The buffer circuit is connected to a first pixel and a second pixel of a plurality of pixels. The AD conversion circuit converts a voltage signal from the buffer circuit into a digital signal. The buffer circuit includes a voltage holding circuit connected to the first pixel, a voltage holding circuit connected to the second pixel, and a switch circuit. The switch circuit selectively switches the voltage holding circuit which outputs a voltage signal to the AD conversion circuit between the voltage holding circuits. The buffer circuit carries out an operation of holding a voltage signal of the first pixel in the voltage holding circuit and an operation of holding a voltage signal of the second pixel in the voltage holding circuit in parallel with each other.

9 Claims, 19 Drawing Sheets

SOLID-STATE IMAGE SENSOR, IMAGING DEVICE, AND AD CONVERTER

CROSS-REFERENCE TO RELATED APPLICATIONS

The disclosure of Japanese Patent Application No. 2022-098938 filed on Jun. 20, 2022 including the specification, drawings and abstract is incorporated herein by reference in its entirety.

BACKGROUND

The present disclosure relates to a solid-state image sensor, an imaging device, and an AD converter, and, for example, is suitably applicable to an image sensor including an integral ADC (Analog-to-Digital Converter), as well as a digital single-lens reflex camera and a monitoring camera each including the image sensor.

There is disclosed a technique listed below.
[Patent Document 1] Japanese Unexamined Patent Application Publication No. 2008-92091

In the past, a solid-state image sensor which outputs a digital image through conversion of voltages of a plurality of pixels has been known. For example, Patent Document 1 discloses an imaging device in which an integral ADC is provided for each vertical array of light receiving elements which are arrayed in vertical and horizontal directions to output a light receiving signal at a digital value.

According to the imaging device described above, a tap signal of a ring oscillator in a phase-locked loop circuit which generates a clock pulse is used as well, and the tap signal is latched by a trigger pulse, and by having the latched phase state as part of a conversion value, it is possible to achieve higher resolution without increasing a frequency of the clock pulse.

SUMMARY

When the pixel count included in the solid-state image sensor is increased, it is possible to enhance the image quality of a digital image which is to be output from the solid-state image sensor. However, the more the pixel count is increased, the longer a time (settling time) required for settling a voltage signal from a pixel is. Accordingly, in order to achieve the higher image quality of the digital image formed of large-scale pixels, maintaining the frame rate of digital image, the settling time for the large-scale pixels is required to be shortened.

Other objects and novel characteristics of the present disclosure will be apparent from the description of the present specification and the accompanying drawings.

A solid-state image sensor according to one embodiment carries out an operation of holding a voltage signal of a first pixel and an operation of holding a voltage signal of a second pixel in parallel with each other, and successively converts the voltage signal of the first pixel and the voltage signal of the second pixel into a digital signal.

According to the one embodiment described above, it is possible to achieve higher image quality of a digital image formed of large-scale pixels, maintaining a frame rate of the digital image.

DETAILED DESCRIPTION

The present disclosure will be described in detail below on the basis of the preferred embodiment with reference to drawings. The same or equivalent components illustrated in the following description are given the same reference sign, and overlapping description may be omitted as appropriate.

First Embodiment

Figure 1:
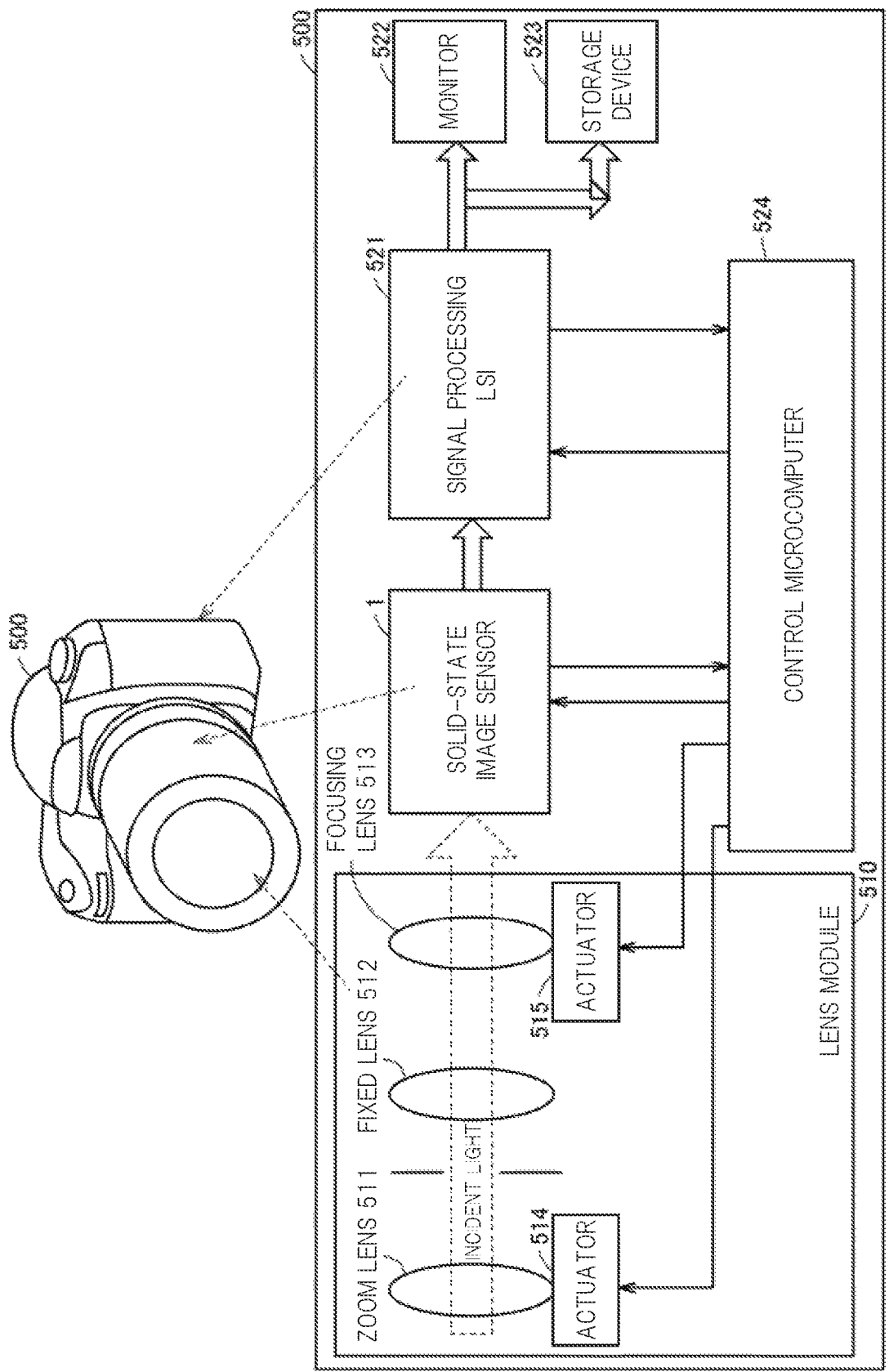
FIG. 1 is a diagram showing an external appearance and a configuration of a digital single-lens reflex camera which is one example of an imaging device including a solid-state image sensor according to a first embodiment of the present disclosure.

FIG. 1 is a diagram showing an external appearance and a configuration of a digital single-lens reflex camera 500 which is one example of an imaging device including a solid-state image sensor 1 according to a first embodiment of the present disclosure. The imaging device may be a monitoring camera, for example.

As shown in FIG. 1, the digital single-lens reflex camera 500 includes a lens module 510, a solid-state image sensor 1, a signal processing LSI (Large-Scale Integrated circuit) 521, a control microcomputer 524, a monitor 522, and a storage device 523.

The control microcomputer 524 controls the lens module 510, the signal processing LSI 521, and the solid-state image sensor 1.

The lens module 510 includes a zoom lens 511, a fixed lens 512, a focusing lens 513, and actuators 514 and 515.

The actuator 514 drives the zoom lens 511 in response to a control command from the control microcomputer 524. The actuator 515 drives the focusing lens 513 in response to a control command from the control microcomputer 524.

Incident light to the lens module 510 passes through the zoom lens 511, the fixed lens 512, and the focusing lens 513 and is input to the solid-state image sensor 1.

The solid-state image sensor 1 generates a digital image from the emitted light from the lens module 510.

When the position of the zoom lens 511 is changed, a zoom magnification of the digital image generated in the solid-state image sensor 1 is thereby changed. When the position of the focusing lens 513 is changed, a focus of the digital image generated in the solid-state image sensor 1 is thereby changed.

The signal processing LSI 521 executes image processing on the digital image generated in the solid-state image sensor 1. The monitor 522 displays an image output from the signal processing LSI 521. The storage device 523 stores the image output from the signal processing LSI 521.

Figure 2:
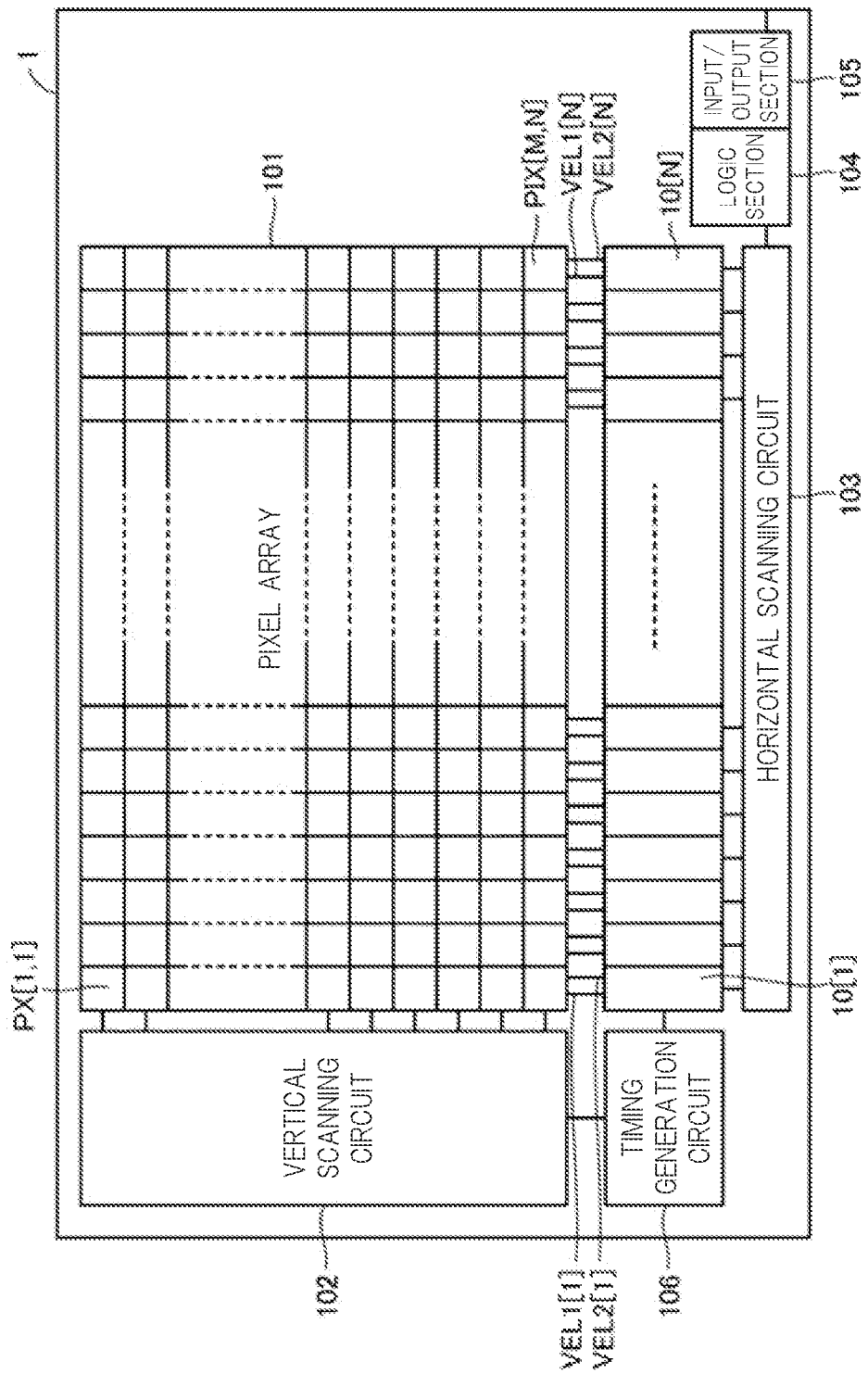
FIG. 2 is a block diagram showing a configuration of the solid-state image sensor shown in FIG. 1.

FIG. 2 is a block diagram showing a configuration of the solid-state image sensor 1 shown in FIG. 1. The solid-state image sensor 1 is a CMOS (Complementary Metal Oxide Semiconductor) image sensor, for example, and formed of a single semiconductor chip.

As shown in FIG. 2, the solid-state image sensor 1 includes a pixel array 101, a vertical scanning circuit 102, column AD converters (ADCs) 10[1] to 10[N] (N is a natural number equal to or larger than two), a horizontal scanning circuit 103, a logic section 104, an input/output section 105, and a timing generation circuit 106.

The pixel array 101 includes a plurality of pixels PIX which are arrayed in a matrix (row-column configuration). The pixel array 101 has M rows (M is a natural number equal to or larger than two), and N columns. In the following description, the pixel in the i-th row and the j-th column is represented as PIX[i,j] (each of i and j is a natural number). A row direction of the pixel array 101 is also referred to as a horizontal direction, and a column direction of the pixel array 101 is also referred to as a vertical direction. The plurality of pixels included in the j-th column are connected to either one of vertical signal lines VEL1[j] or VEL2[j].

Figure 3:
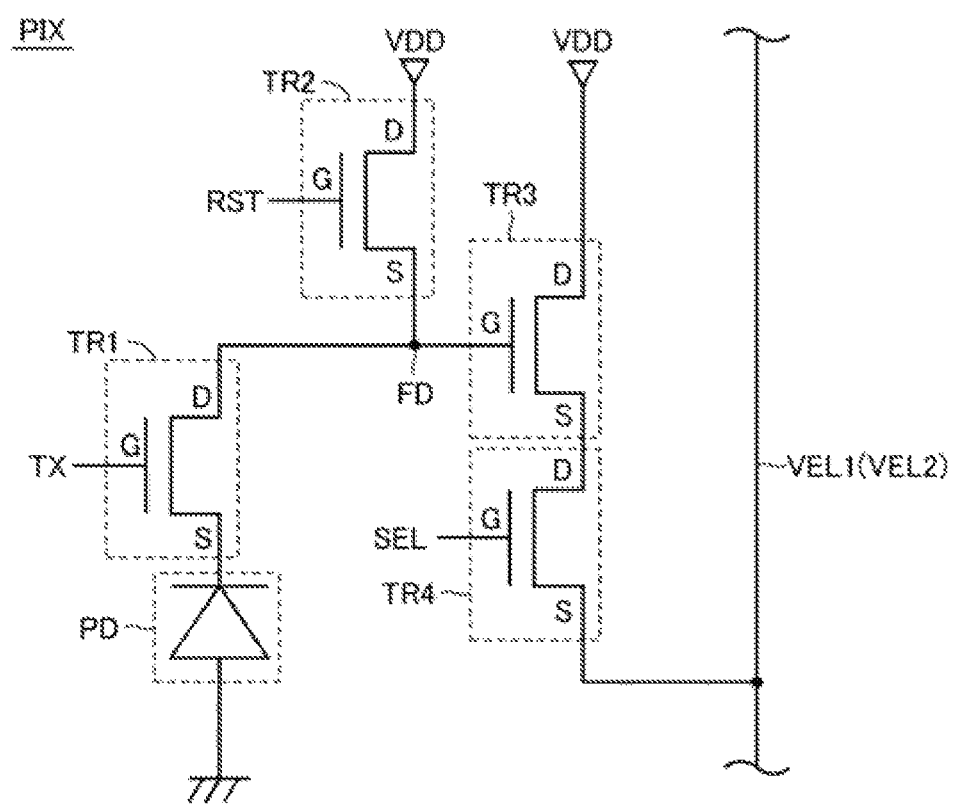
FIG. 3 is an equivalent circuit diagram showing one example of a configuration of a pixel shown in FIG. 2.

The vertical scanning circuit 102 scans the pixels in the vertical direction. The vertical scanning circuit 102 controls voltages of horizontal signal lines TX, RST, and SEL which are shown in FIG. 3 to be referred to, subsequent to FIG. 2.

The column ADCs 10[1] to 10[N] are provided in N number individually corresponding to a plurality of columns of the pixel array 101, and arrayed in the row direction along a lower side of the pixel array 101. The column ADC 10[j] is connected to the vertical signal lines VEL1[j] and VEL2[j]. Each of the column ADCs 10 is connected to the vertical signal lines in a corresponding column, and receives voltage signals which are output from the pixels PIX in the corresponding column. The column ADC 10 amplifies the received voltage signal and performs AD conversion on the amplified voltage signal, to thereby output a digital signal corresponding to the voltage signal. The column ADC 10 is, for example, an integral ADC, and more specifically, a single slope ADC.

The horizontal scanning circuit 103 performs parallel transfer on N digital signals individually output from the column ADCs 10[1] to 10[N] in the horizontal direction in parallel with each other. The timing generation circuit 106 outputs a timing signal which controls an operation timing for a circuit in each of the pixel array 101 and the columns ADC 10[1] to 10[N] to the pixel array 101 and each of the column ADCs 10.

The logic section 104 controls an operation of each component of the solid-state image sensor 1 according to a command provided from the outside.

The input/output section 105 performs parallel-serial conversion on the N digital signals transferred by the horizontal scanning circuit 103 into serial signals, and outputs these signals outside the solid-state image sensor 1. The input/output section 105 further receives a command or the like from the outside.

FIG. 3 is an equivalent circuit diagram showing one example of a configuration of a pixel PIX shown in FIG. 2. As shown in FIG. 3, the pixel PIX includes a photodiode (photoelectric conversion element) PD, a transfer transistor TR1, a reset transistor TR2, an amplification transistor TR3, and a selection transistor TR4. In a case in which the solid-state image sensor 1 is a CMOS image sensor, each of the transistors TR1 to TR4 includes an NMOS (N-channel MOS) transistor.

The photodiode PD accumulates charges corresponding to an amount of incident light by photoelectric conversion. An anode of the photodiode PD is connected to a ground potential. A cathode of the photodiode PD is connected to a source of the transfer transistor TR1.

A gate of the transfer transistor TR1 is connected to a horizontal signal line TX. A drain of the transfer transistor TR1 is connected to a floating diffusion FD. The transfer transistor TR1 transfers the charges accumulated in the photodiode PD to the floating diffusion FD.

A drain of the reset transistor TR2 is connected to the power supply potential VDD. A gate of the reset transistor TR2 is connected to the horizontal signal line RST. A source of the reset transistor TR2 is connected to the floating diffusion FD. The reset transistor TR2 resets the charges in the floating diffusion FD to a predetermined voltage level (a level of the power supply potential VDD).

A gate of the amplification transistor TR3 is connected to the floating diffusion FD. A drain of the amplification transistor TR3 is connected to the power supply potential VDD. A source of the amplification transistor TR3 is connected to a drain of the selection transistor TR4. The amplification transistor TR3 amplifies the voltage of the floating diffusion FD in a source follower mode.

A gate of the selection transistor TR4 is connected to the horizontal signal line SEL. A source of the selection transistor TR4 is connected to the vertical signal lines VEL. The selection transistor TR4 outputs a voltage signal transmitted from the amplification transistor TR3 to the vertical signal line VEL.

Reading out of data accumulated in the photodiode PD of the pixel PIX is successively carried out for each row. For example, in a case in which data reading of each pixel PIX in the p-row (p is a natural number) is carried out, first, a voltage in the horizontal signal line TX[p] is set to a low (L) level (the transfer transistor TR1 is turned off) and a voltage of the horizontal signal line SEL[p] is set to a high (H) level (the selection transistor TR4 is turned on).

Setting the horizontal signal line RST[p] to the H level (the reset transistor TR2 is turned on) allows the charges in the floating diffusion FD to be reset. A voltage signal (Dark signal) of the floating diffusion FD in a state in which the charges from the photodiode PD are not transferred to the floating diffusion FD (dark state) is output to the column ADC 10 through the vertical signal line VEL. Then, the horizontal signal line RST[p] is set to the L level (the reset transistor TR2 is turned off).

Setting the voltage of the horizontal signal line TX[p] to the H level (the transfer transistor TR1 is turned on) allows the charges accumulated in the photodiode PD to be transferred to the floating diffusion FD by the transfer transistor TR1. As a result, a voltage signal (Sig signal) corresponding to the amount of incident light is output from the floating diffusion FD through the vertical signal line VEL to the column ADC 10.

Note that, in FIG. 3, such a configuration that one pixel PIX is provided with one photodiode PD and one transfer transistor TR1 is shown. Alternatively, one pixel PIX may be provided with a plurality of photodiodes PD and a plurality of transfer transistors TR1.

In the following description, in order to show advantages of the solid-state image sensor 1 according to the first embodiment clearly, prior to a description of the column ADC 10, a solid-state image sensor 9 according to a comparative example will be described.

Figure 4:
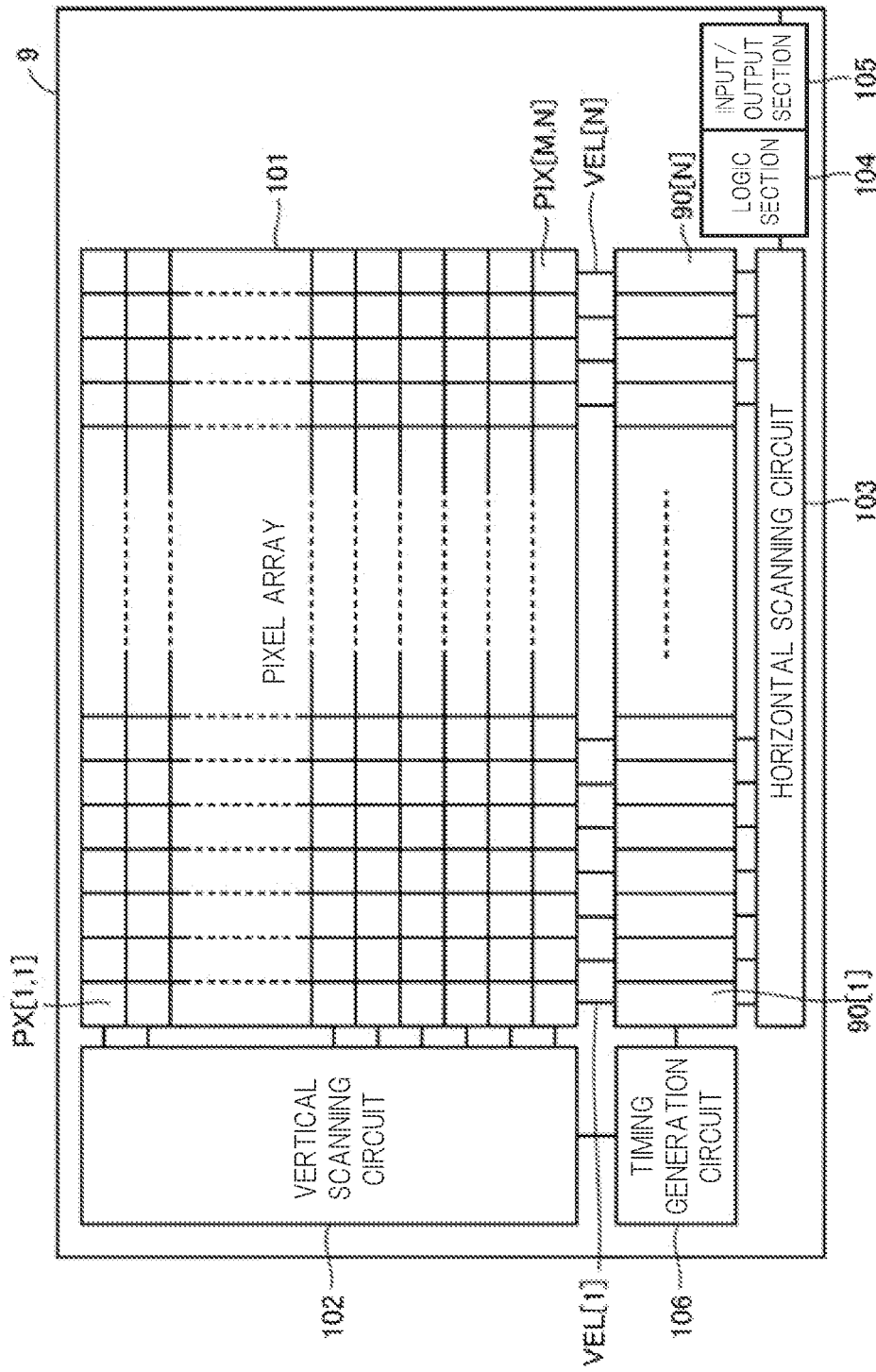
FIG. 4 is a block diagram showing one example of a configuration of a solid-state image sensor according to a comparative example.

FIG. 4 is a block diagram showing one example of a configuration of a solid-state image sensor 9 according to the comparative example. The configuration of the solid-state image sensor 9 is different from that of the solid-state image sensor 1 in that the column ADC 10 of the solid-state image sensor 1 in FIG. 2 is replaced with a column ADC 90 and a plurality of pixels included in the j-th column in the pixel array 101 are connected to one vertical signal line VEL[j]. The configuration of other components of the solid-state image sensor 9 is similar to that of the solid-state image sensor 1, and description thereof is omitted.

Figure 5:
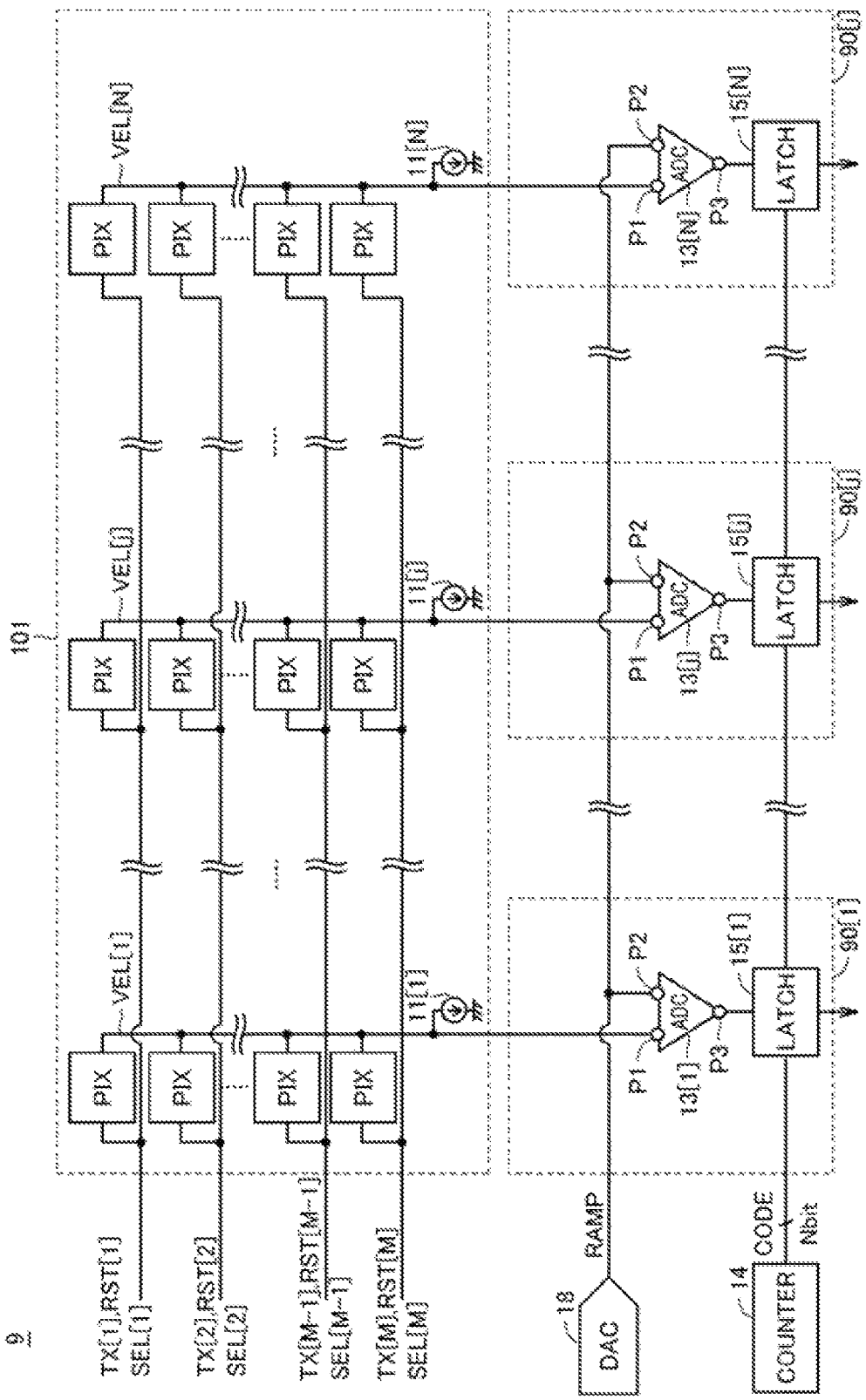
FIG. 5 is a block diagram showing a specific configuration of each of a pixel array and a column ADC shown in FIG. 4.

FIG. 5 is a block diagram showing a specific configuration of each of the pixel array 101 and the column ADC 90 shown in FIG. 4. As shown in FIG. 5, each of the plurality of pixels in the i-th row is connected to the horizontal signal lines TX[i], RST[i], and SEL[i]. A current source 11[j] is connected between the vertical signal line VEL[j] and the ground potential.

The column ADC 90[j] includes an AD conversion circuit 13[j] and a latch (flip-flop) circuit 15[j]. The vertical signal line VEL[j] is connected to an input terminal P1 of the AD conversion circuit 13[j]. An input terminal P2 of the AD conversion circuit 13[j] is connected to the DAC (Digital-to-Analog Converter) 18. An output terminal P3 of the AD conversion circuit 13[j] is connected to the latch circuit 15[j]. An n-bit count signal CODE (n is 10 or 12, for example) is input to the latch circuit 15[j] from a counter 14.

The DAC 18 outputs a ramp signal RAMP as a reference signal. The ramp signal RAMP is a voltage signal which is swept with a constant gradient from a timing at which the horizontal signal line TX[j] is changed from the H level to the L level. In addition, the counter 14 starts to count up from 0 of the count signal CODE from the timing.

The AD conversion circuit 13[j] changes the level of the output signal from the L level to the H level at a timing at which the ramp signal RAMP reaches an analog signal input from the vertical signal line VEL[j].

The latch circuit 15[j] holds a value of the count signal CODE at the timing, as a digital signal corresponding to the analog signal. The digital signal held in the latch circuit 15 is successively read out by the horizontal scanning circuit 103 in FIG. 4.

Figure 6:
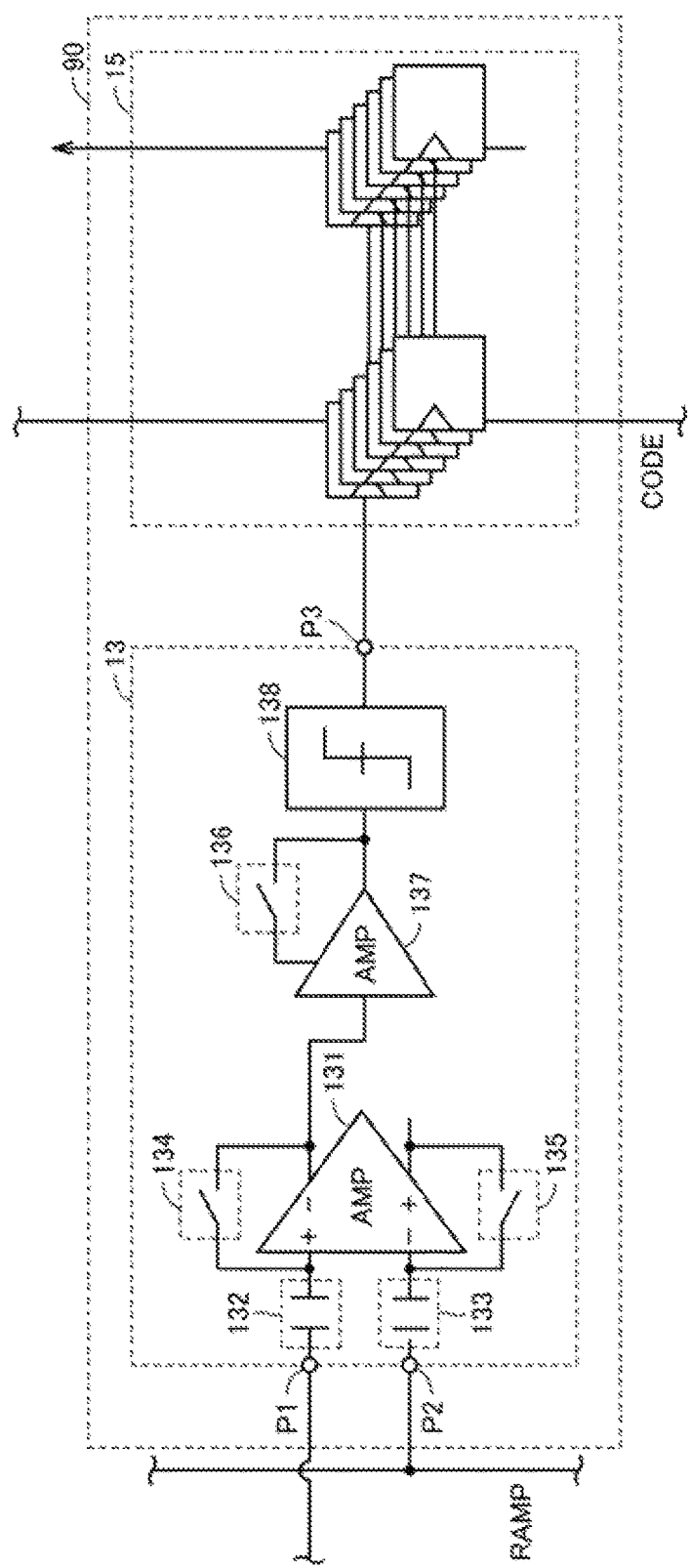
FIG. 6 is an equivalent circuit diagram showing one example of a circuit configuration of the column ADC shown in FIG. 5.

FIG. 6 is an equivalent circuit diagram showing one example of a circuit configuration of the column ADC 90 shown in FIG. 5. As shown in FIG. 6, the ADC conversion circuit 13 includes the input terminal P1, the input terminal P2, the output terminal P3, a fully-differential amplifier 131, capacitive elements 132 and 133, switches 134, 135, and 136, a control amplifier 137, and a binarization circuit 138.

The capacitive element 132 is connected between the input terminal P1 and a non-inverting input terminal of the fully-differential amplifier 131. The capacitive element 133 is connected between the input terminal P2 and an inverting input terminal of the fully-differential amplifier 131. The switch 134 is connected between the non-inverting input terminal and another inverting output terminal of the fully-differential amplifier 131. The switch 135 is connected between the inverting input terminal and another non-inverting output terminal of the fully-differential amplifier 131.

The other inverting output terminal of the fully-differential amplifier 131 is connected to a control terminal of the control amplifier 137. The switch 136 is connected between an input terminal and an output terminal of the control amplifier 137.

The binarization circuit 138 is connected between the output terminal of the control amplifier 137 and the output terminal P3. The binarization circuit 138 is, for example, a CMOS inverter. At a timing at which a signal level of the ramp signal RAMP reaches a signal level of the input terminal P1, a logic level of the binarization circuit 138 is inverted. The value of the count signal CODE at the timing is held in the latch circuit 15.

Figure 7:
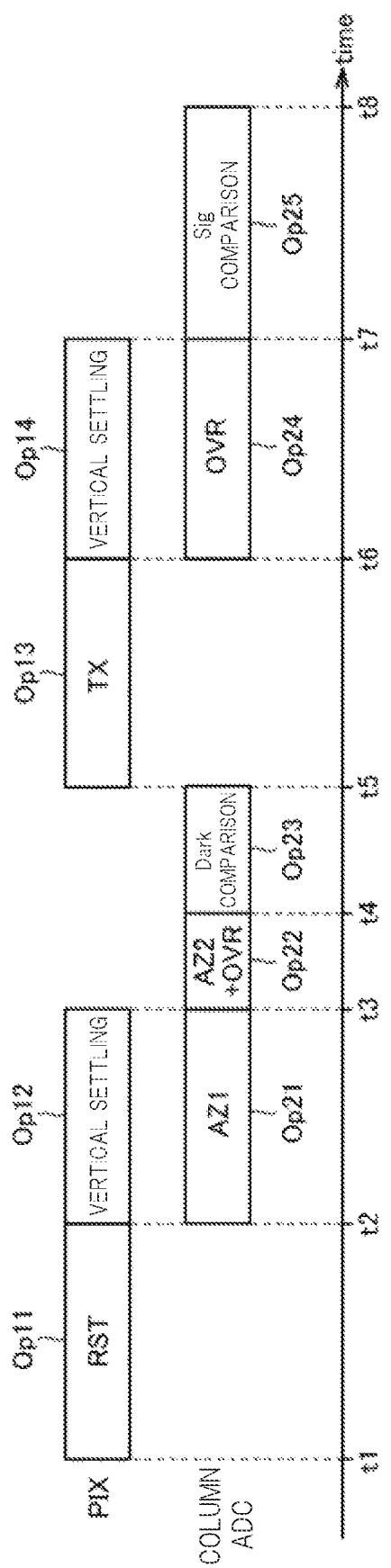
FIG. 7 is a timing chart showing one example of an order of a plurality of operations executed until the column ADC in FIG. 6 converts a voltage signal from one pixel into a digital signal.

FIG. 7 is a timing chart showing one example of an order of a plurality of operations executed until the column ADC 90 in FIG. 6 converts a voltage signal from one pixel into a digital signal.

With reference to FIG. 3, FIG. 6, and FIG. 7 together, in the pixel PIX, operations Op11, Op12, Op13, and Op14 are carried out in this order. In the column ADC 90, operations Op21, Op22, Op23, Op24, and Op25 are carried out in this order.

In the pixel PIX, during time points t1 to t2, the operation Op 11 is carried out. The operation Op11 includes a reset operation of the floating diffusion FD by the reset transistor TR2. During time points t2 to t3, the operation Op 12 is carried out. The operation Op12 includes a standby operation for settling the floating diffusion FD.

In the column ADC 90, in parallel with the operation Op12 in the pixel PIX, the operation Op21 is carried out. The operation Op21 includes an AZ (Auto Zero)1 operation. In the AZ1 operation, the switch 134 in FIG. 6 is turned on (in a conductive state), and the non-inverting input terminal and the inverting output terminal of the fully-differential amplifier 131 to which the switch 134 is connected are short-circuited. At the same time, the switch 135 is turned on, and the inverting input terminal and the non-inverting output terminal of the fully-differential amplifier 131 to which the switch 135 is connected are short-circuited.

During time points t3 to t4, the operation Op22 is carried out. The operation Op22 includes an AZ2 operation and an OVR (Over Range) operation. In the AZ2 operation, the switch 136 in FIG. 6 is turned on, and the control terminal and the output terminal of the control amplifier 137 are short-circuited. In the OVR operation, a voltage level of the ramp signal RAMP is increased from 0 level. During time points t4 to t5, the operation Op23 is carried out. The operation Op23 includes a comparison operation (Dark comparison operation) of comparing the Dark signal with the ramp signal RAMP to remove an offset of the fully-differential amplifier 131.

In the pixel PIX, during time points t5 to t6, the operation Op13 is carried out. The operation Op13 includes a transfer operation of the charges from the photodiode PD to the floating diffusion FD by the transfer transistor TR1. During time points t6 to t7, the operation Op14 is carried out. The operation Op14 includes a standby operation for settling the floating diffusion FD.

In the column ADC 90, in parallel with the operation Op14 in the pixel PIX, the operation Op24 is carried out. The operation Op 24 includes an OVR operation. During time points t7 to t8, the operation Op25 is carried out. The operation Op25 includes a comparison operation (Sig comparison operation) for converting the Sig signal into a digital signal by comparison of the Sig signal and the ramp signal RAMP.

Increasing the pixel count of the solid-state image sensor 9 makes it possible to enhance the image quality of the digital image to be output from the solid-state image sensor 9. However, the more the pixel count is increased, the longer a period of time for settling the pixel (the operations Op12 and Op14 in FIG. 7) is. According to miniaturization of a process, even if a processing speed of the column ADC 90 is made higher, an operation time on the pixel PIX side regulates a conversion rate of the solid-state image sensor 9. Accordingly, in order to achieve higher image quality of a digital image formed of large-scale pixels, maintaining a frame rate of the digital image, a settling time for a pixel in the large-scale pixels is required to be shortened.

In view of this, in the solid-state image sensor 1, operations of holding voltage signals of two pixels are carried out in parallel with each other. According to the solid-state image sensor 1, settling operations for two pixels can be overlapped with each other, so that a time required to convert voltage signals from the plurality of pixels PIX into the digital signals can be reduced further than the solid-state image sensor 9 in which the settling operations for two pixels are successively carried out. As a result, it is possible to achieve higher image quality of a digital image formed of large-scale pixels, maintaining a frame rate of the digital image.

Figure 8:
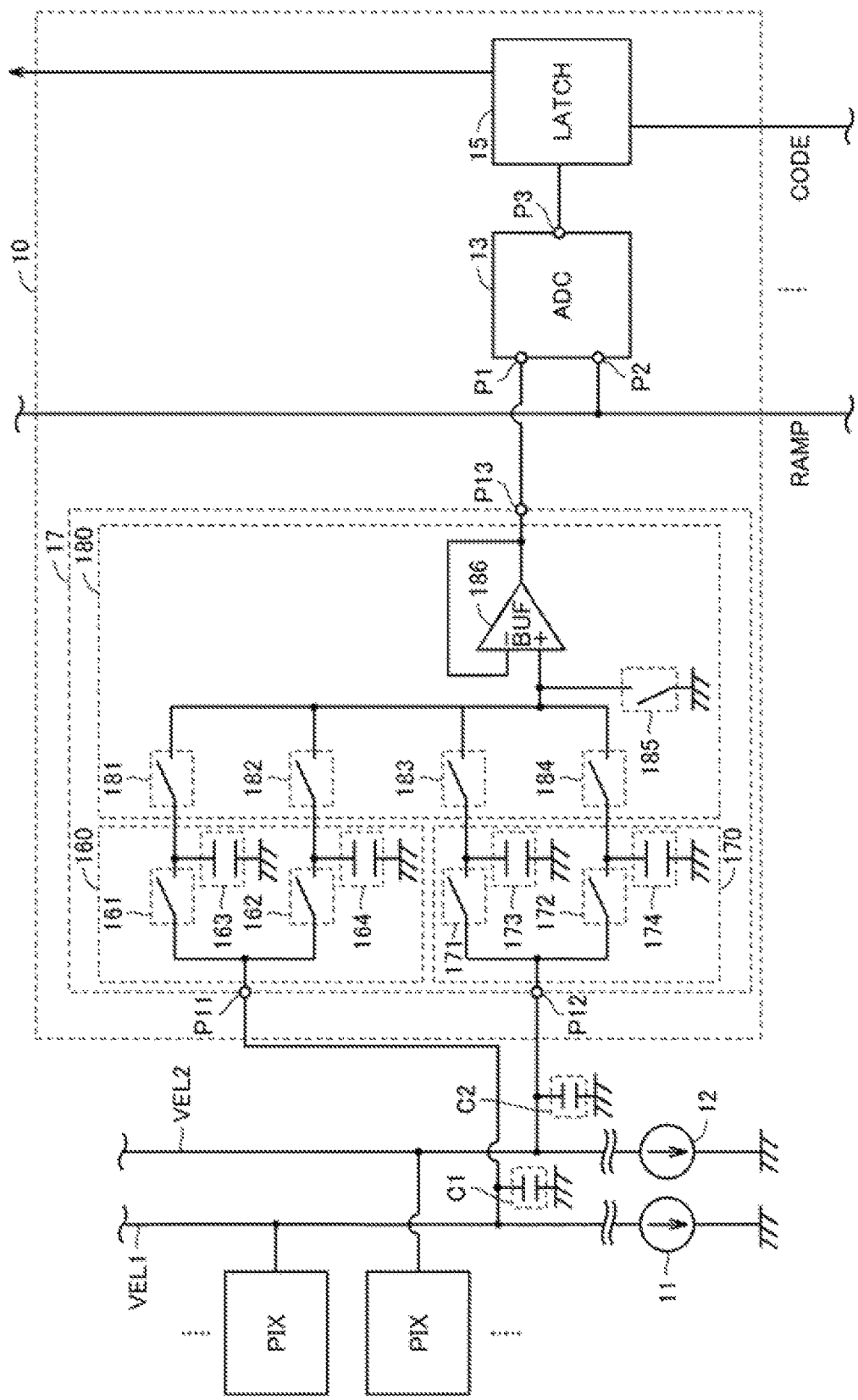
FIG. 8 is an equivalent circuit diagram showing one example of a circuit configuration of a column ADC shown in FIG. 2.

FIG. 8 is an equivalent circuit diagram showing one example of a circuit configuration of a column ADC 10 shown in FIG. 2. The circuit configuration of the column ADC 10 is a configuration in which a pipeline buffer circuit 17 is added to the circuit configuration of the column ADC 90 shown in FIG. 6. The circuit configuration of other components of the column ADC 10 is similar to that of the column ADC 90, and description thereof is omitted.

As shown in FIG. 8, the pipeline buffer circuit 17 includes input terminals P11 and P12, an output terminal P13, voltage holding circuits 160 and 170, and a switch circuit 180. The input terminal P11 is connected to the vertical signal line VEL1. A current source 11 is connected between the vertical signal line VEL1 and the ground potential. A capacitive element C1 connected between the input terminal P11 and the ground potential represents a parasitic capacitance of the vertical signal line VEL1.

The input terminal P12 is connected to the vertical signal line VEL2. A current source 12 is connected between the vertical signal line VEL2 and the ground potential. A capacitive element C2 between the input terminal P12 and the ground potential represents a parasitic capacitance of the vertical signal line VEL2. The output terminal P13 is connected to the input terminal P1 of the AD conversion circuit 13.

The voltage holding circuit 160 is connected between the input terminal P11 and the switch circuit 180. The voltage holding circuit 160 holds the voltage of the pixel PIX connected to the vertical signal line VEL1. The voltage holding circuit 160 includes switches 161 and 162, and capacitive elements 163 and 164.

The voltage holding circuit 170 is connected between the input terminal P12 and the switch circuit 180. The voltage holding circuit 170 holds the voltage of the pixel PIX connected to the vertical signal line VEL2. The voltage holding circuit 170 includes switches 171 and 172, and capacitive elements 173 and 174.

The switch circuit 180 is connected to the output terminal P13. The switch circuit 180 includes switches 181, 182, 183, 184, and 185, and a voltage follower circuit 186.

The switches 161 and 181 are connected in series between the input terminal P11 and a non-inverting input terminal of the voltage follower circuit 186, in this order. The switches 162 and 182 are connected in series between the input terminal P11 and the non-inverting input terminal of the voltage follower circuit 186, in this order. The switches 161 and 181 which are connected in series to each other and the switches 162 and 182 which are connected in series to each other are connected in parallel with each other between the input terminal P11 and the non-inverting input terminal of the voltage follower circuit 186.

The capacitive element 163 is connected between a connecting point of the switches 161 and 181 and the ground potential. The capacitive element 164 is connected between a connecting point of the switches 162 and 182 and the ground potential.

The switches 171 and 183 are connected in series between the input terminal P12 and the non-inverting input terminal of the voltage follower circuit 186, in this order. The switches 172 and 184 are connected in series between the input terminal P12 and the non-inverting input terminal of the voltage follower circuit 186, in this order. The switches 171 and 183 which are connected in series to each other and the switches 172 and 184 which are connected in series to each other are connected in parallel with each other between the input terminal P12 and the non-inverting input terminal of the voltage follower circuit 186.

The capacitive element 173 is connected between a connection point of the switches 171 and 183 and the ground potential. The capacitive element 174 is connected between a connection point of the switches 172 and 184 and the ground potential.

The switch 185 is connected between the non-inverting input terminal of the voltage follower circuit 186 and the ground potential. An output terminal of the voltage follower circuit 186 is connected to the output terminal P13, and is short-circuited with an inverting input terminal of the voltage follower circuit 186.

Figure 9:
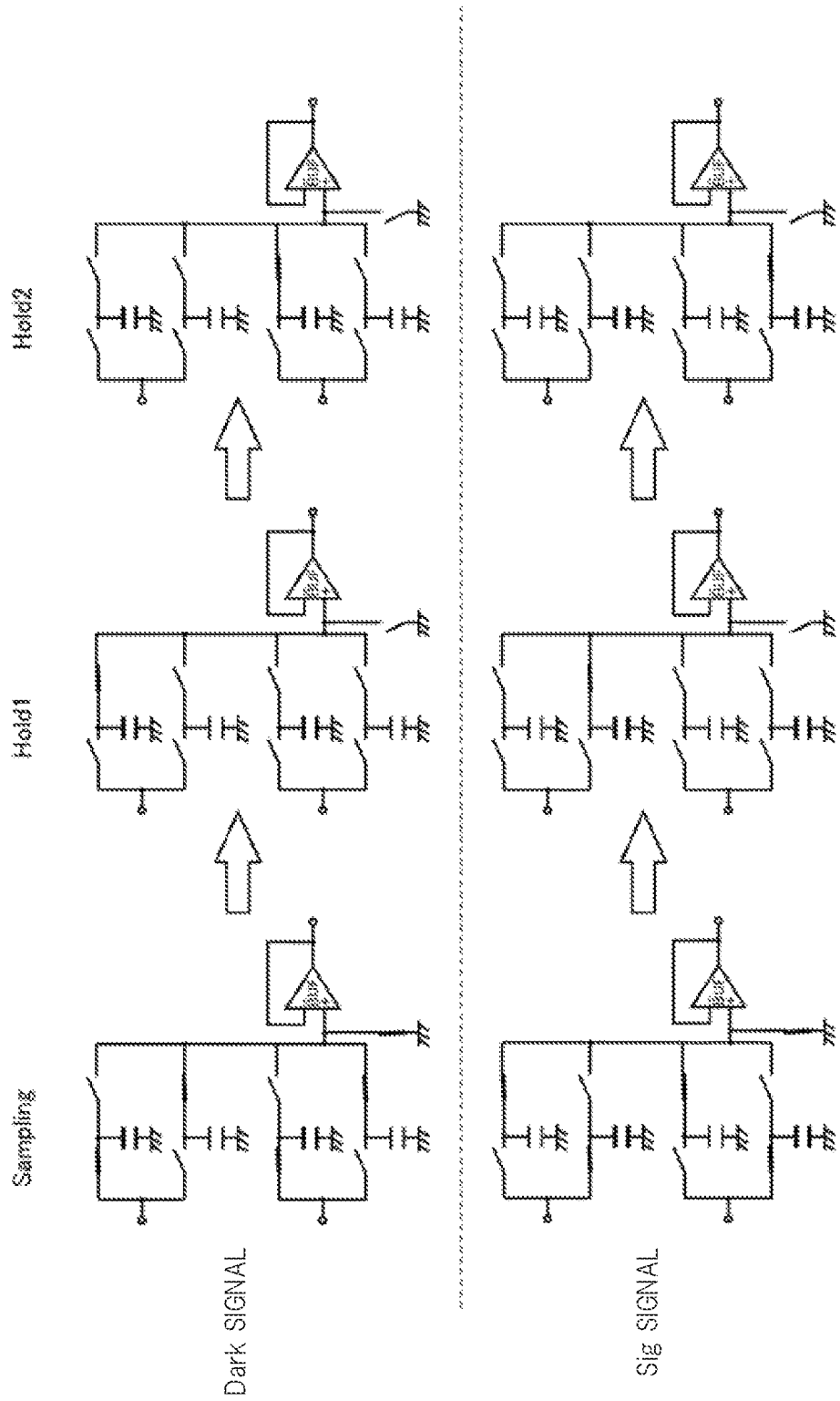
FIG. 9 is a diagram showing an operation of a pipeline buffer circuit in FIG. 8 in AD conversion of a Dark signal and a Sig signal.

FIG. 9 is a diagram showing an operation of the pipeline buffer circuit 17 in FIG. 8 in AD conversion of a Dark signal and a Sig signal.

With reference to FIG. 8 and FIG. 9 together, in a sampling operation of the Dark signal, the switches 161, 171, 182, 184, and 185 are turned on, and the switches 162, 172, 181, and 183 are turned off (in a non-conductive state). More specifically, sampling operations for the voltage of the pixel PIX connected to the vertical signal line VEL1 and the voltage of the pixel PIX connected to the vertical signal line VEL2 are carried out in parallel with each other.

According to the sampling operation for the Dark signal, the voltage of the pixel PIX connected to the vertical signal line VEL1 is held in the capacitive element 163. The voltage of the pixel PIX connected to the vertical signal line VEL2 is held in the capacitive element 173.

Subsequent to the sampling of the Dark signal, an operation (Hold1) of outputting the voltage of the pixel PIX connected to the vertical signal line VEL1 to the AC conversion circuit 13 and an operation (Hold2) of outputting the voltage of the pixel PIX connected to the vertical signal line VEL2 to the AC conversion circuit 13 are carried out in this order.

In the operation Hold1, the switches 161, 171, 182, 184, and 185 are turned off, and the switch 181 is turned on. The voltage of the capacitive element 163 is output through the voltage follower circuit 186 to the AD conversion circuit 13.

In the operation Hold2, the switch 181 is turned off, and the switch 183 is turned on. The voltage of the capacitive element 173 is output through the voltage follower circuit 186 to the AD conversion circuit 13.

After the operation Hold2 for the Dark signal, the sampling operation for the Sig signal is carried out. In the sampling operation for the Sig signal, the switches 162, 172, 181, and 185 are turned on.

By carrying out the sampling operation for the Sig signal, the voltage of the pixel PIX connected to the vertical signal line VEL1 is held in the capacitive element 164. The voltage of the pixel PIX connected to the vertical signal line VEL2 is held in the capacitive element 174.

In the operation Hold1, the switches 162, 172, 181, 183, and 185 are turned off, and the switch 182 is turned on. The voltage of the capacitive element 164 is output through the voltage follower circuit 186 to the AD conversion circuit 13.

In the operation Hold2, the switch 182 is turned off, and the switch 184 is turned on. The voltage of the capacitive element 174 is output through the voltage follower circuit 186 to the AD conversion circuit 13.

Figure 10:
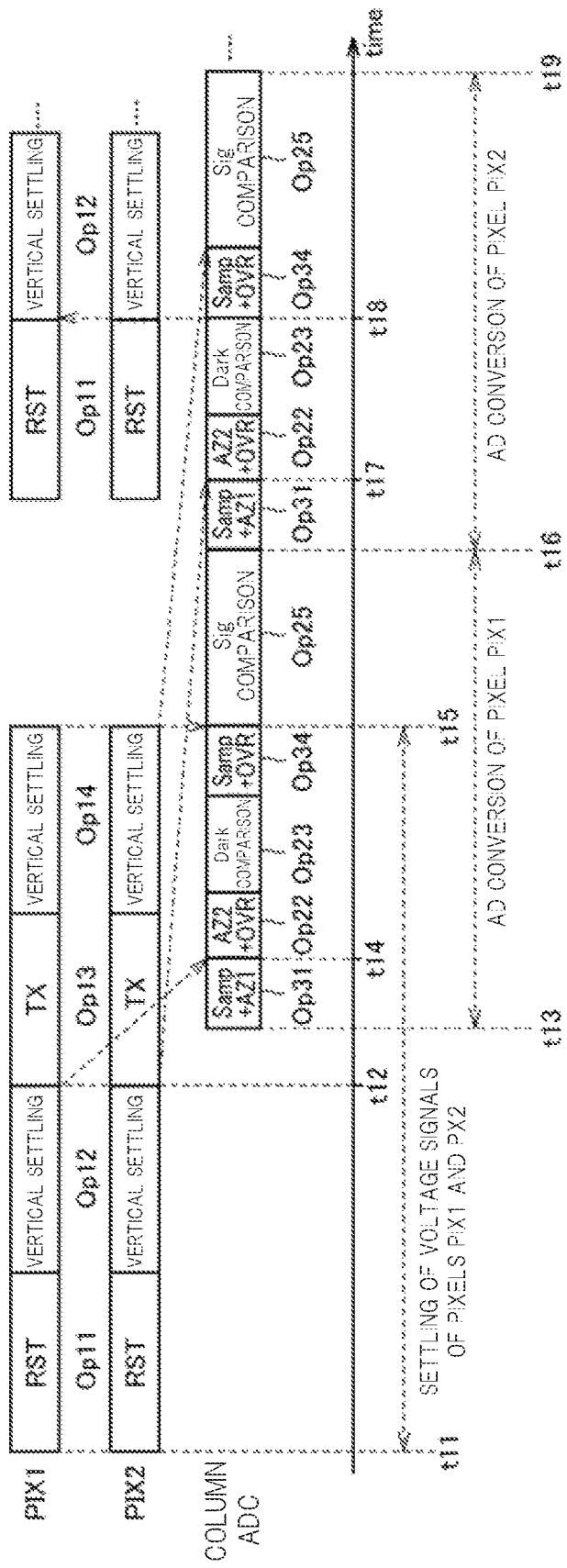
FIG. 10 is a timing chart showing one example of an order of a plurality of operations executed until the column ADC in FIG. 8 converts voltage signals from two pixels into digital signals.

FIG. 10 is a timing chart showing one example of an order of a plurality of operations executed until the column ADC 10 in FIG. 8 converts voltage signals from the two pixels PIX1 and PIX2 into digital signals.

In FIG. 10, the pixels connected to the vertical signal lines VEL1 and VEL2 are denoted by the pixels PIX1 and PIX2, respectively. Also, the operations Op11 to Op14 as well as the operations Op22, Op23, and Op25 in FIG. 10 correspond to the operations with the same reference signs shown in FIG. 7.

As shown in FIG. 10, during time points t11 to t15, the settling operation for the voltage signal of the pixel PIX1 and the settling operation for the voltage signal of the pixel PIX2 are carried out in parallel with each other. Both settling operations are overlapped with each other in the whole period of time. In a settling operation for a voltage signal of one pixel, the operations Op11 to Op14 are continuously carried out.

From the time point t13 subsequent to the time point t12 at which the operation Op12 ends, in the column ADC 10, AD conversion operations for the pixels PIX1 and PIX2 are continuously carried out. The AD conversion operation for the pixel PIX1 is carried out during the time points t13 to t16. The AD conversion operation for the pixel PIX2 is carried out during the time points t16 to t19.

Regarding the AD conversion operation for one pixel, the operations Op31, Op22, Op23, Op34, and Op25 are continuously carried out in this order. In the operation Op31, the sampling operation for the Dark signal and the AZ1 operation are carried out. In the operation Op34, the sampling operation for the Sig signal and the OVR operation are carried out.

In the AD conversion operation for the pixel PIX1, the operation Op 22 is started from the time point t14 subsequent to the time point t12 at which the operation Op12 which is a settling operation after the reset of the pixel PIX1 ends. The operation Op25 which is the Sig comparison operation for the pixel PIX1 is started from the time point t15 at which the settling of the voltage signal of the pixel PIX1 ends. A time interval for which the operations Op31, Op22, Op23, and Op34 are carried out is overlapped with part of the operation Op13 and the operation Op14.

In the AD conversion operation for the pixel PIX2, the operation Op22 is started from the time point t17 subsequent to the time point t12 at which the operation Op 12 which is the settling operation after the reset of the pixel PIX2 ends. The operation Op25 which is the Sig comparison operation for the pixel PIX2 is started from the time point t18 subsequent to the time point t15 at which the settling of the voltage signal of the pixel PIX2 ends.

While the operation Op31 in the AD conversion operation for the pixel PIX2 is carried out, settling operations of voltage signals of next pixels PIX1 and PIX2 are started. The operation Op12 which is the settling operation after the reset of each of the pixels PIX1 and PIX2 is started from the time point t18 at which the operation Op23 which is the Dark comparison operation in the AD conversion operation for the current pixel PIX2 ends.

With reference to FIG. 7 and FIG. 10 together, a conversion time required to convert voltage signals from two pixels PIX into digital signals is twice the time interval from the time points t1 to t8 in FIG. 7. In contrast, the conversion time in FIG. 10 is the time interval from the time points t11 to t19. The time interval from the time points t11 to t19 in FIG. 10 is shorter than twice the time interval from the time points t1 to t8 in FIG. 7. As a result, the solid-state image sensor 1 can achieve higher AD conversion than the solid-state image sensor 9.

As described above, according to the solid-state image sensor of the first embodiment, it is possible to achieve higher image quality of a digital image formed of large-scale pixels, maintaining a frame rate of the digital image.

Second Embodiment

The solid-state image sensor of the first embodiment includes the pipeline buffer circuit having the capacitive elements and the switches. An effect of the capacitive element on the size of the solid-state image sensor is larger than that of the switch. In view of this, in a second embodiment, a configuration in which a circuit configuration for reduction of kT/C noise is used to reduce a capacitance of a capacitive element, maintaining a noise power, thereby reducing the size of the solid-state image sensor, will be described.

Figure 11:
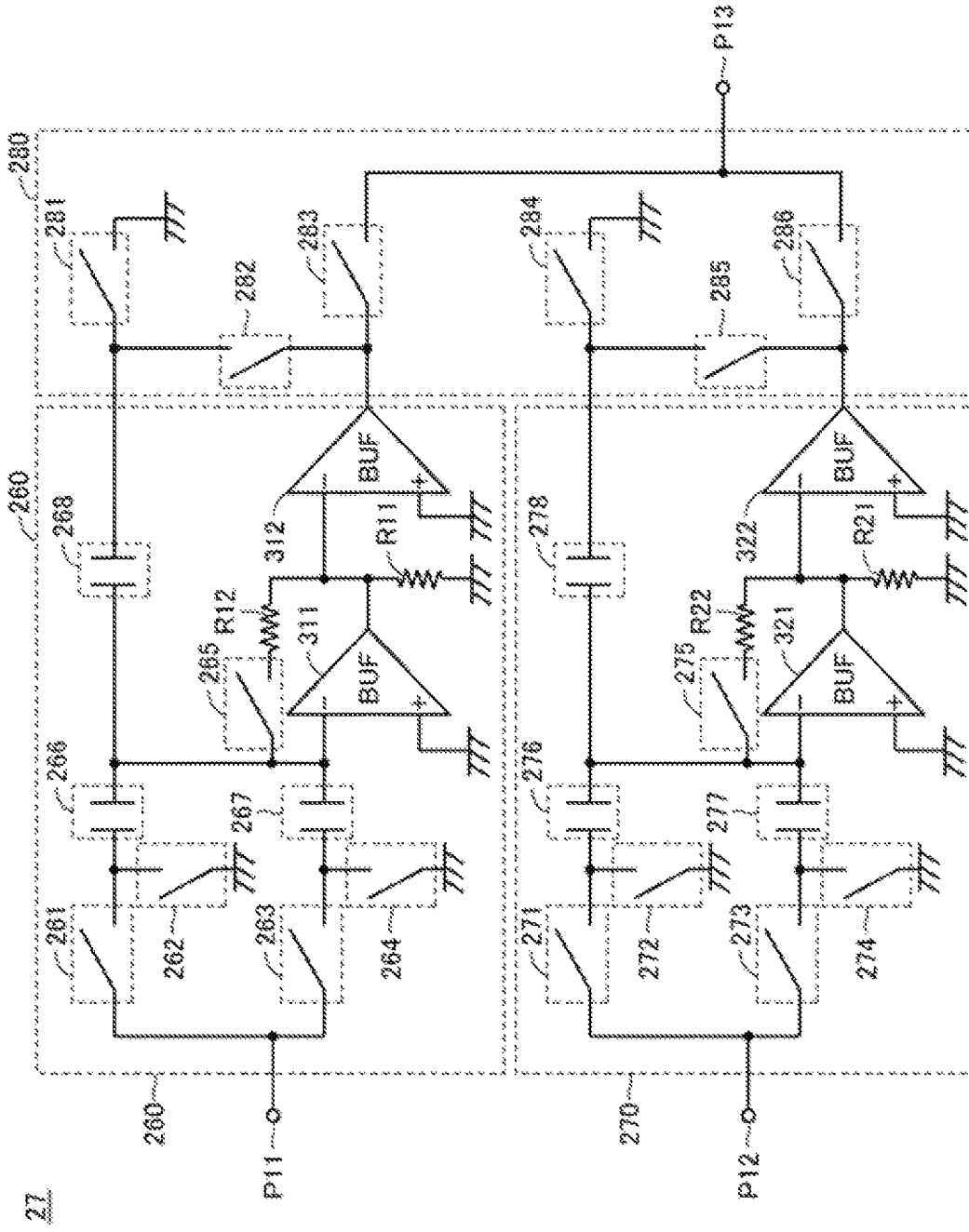
FIG. 11 is an equivalent circuit diagram showing one example of a circuit configuration of a pipeline buffer circuit included in a solid-state image sensor according to a second embodiment of the present disclosure.

FIG. 11 is an equivalent circuit diagram showing one example of a circuit configuration of a pipeline buffer circuit 27 included in a solid-state image sensor according to the second embodiment of the present disclosure. The pipeline buffer circuit 27 has a circuit configuration in which the voltage holding circuits 160 and 170 and the switch circuit 180 in FIG. 8 are replaced with voltage holding circuits 260 and 270 and a switch circuit 280, respectively. The configuration of other components of the pipeline buffer circuit 27 is similar to that of the pipeline buffer circuit 17, and description thereof is omitted.

As shown in FIG. 11, the voltage holding circuit 260 includes switches 261, 262, 263, 264, and 265, capacitive elements 266, 267, and 268, resistive elements R12 and R11, and operational amplifiers 311 and 312. The voltage holding circuit 270 includes switches 271, 272, 273, 274, and 275, capacitive elements 276, 277, and 278, resistive elements R22 and R21, and operational amplifiers 321 and 322.

The switch 261 and the capacitive element 266 are connected in series between the input terminal P11 and an inverting input terminal of the operational amplifier 311 in this order. The switch 262 is connected between a connecting point of the switch 261 and the capacitive element 266, and the ground potential.

The switch 263 and the capacitive element 267 are connected in series between the input terminal P11 and an inverting input terminal of the operational amplifier 311. The switch 264 is connected between a connecting point of the switch 263 and the capacitive element 267, and the ground potential.

The switch 261 and the capacitive element 266 which are connected in series with each other and the switch 263 and the capacitive element 267 which are connected in series with each other are connected in parallel with each other between the input terminal P11 and the inverting input terminal of the operational amplifier 311.

The capacitive element 268 and the switch 281 are connected in series between the capacitive element 266 and the ground potential, in this order. The switches 282 and 283 are connected in series between a connecting point of the capacitive element 268 and the switch 281 and the output terminal P13, in this order.

A non-inverting input terminal of the operational amplifier 311 is connected to the ground potential. The switch 265 and the resistive elements R12 and R11 are connected between the inverting input terminal of the operational amplifier 311 and the ground potential.

An output terminal of the operational amplifier 311 is connected to a connecting point of the resistive elements R12 and R11. The connecting point of the resistive elements R12 and R11 is connected to an inverting input terminal of the operational amplifier 312. A non-inverting input terminal of the operational amplifier 312 is connected to the ground potential. An output terminal of the operational amplifier 312 is connected to a connecting point of the switches 282 and 283.

The switch 271 and the capacitive element 276 are connected in series between the input terminal P12 and an inverting input terminal of the operational amplifier 321, in this order. The switch 272 is connected between a connecting point of the switch 271 and the capacitive element 276, and the ground potential.

The switch 273 and the capacitive element 277 are connected in series between the input terminal P12 and the inverting input terminal of the operational amplifier 321. The switch 274 is connected between a connecting point of the switch 273 and the capacitive element 277 and the ground potential.

The switch 271 and the capacitive element 276 which are connected in series with each other and the switch 273 and the capacitive element 277 which are connected in series with each other are connected in parallel with each other between the input terminal P12 and the inverting input terminal of the operational amplifier 321.

The capacitive element 278 and the switch 284 are connected in series between the capacitive element 276 and the ground potential, in this order. The switches 285 and 286 are connected in series between a connecting point of the capacitive element 278 and the switch 284 and the output terminal P13, in this order.

A non-inverting input terminal of the operational amplifier 321 is connected to the ground potential. The switch 275 and the resistive elements R22 and R21 are connected in series to the inverting input terminal of the operational amplifier 321 and the ground potential, in this order.

An output terminal of the operational amplifier 321 is connected to a connecting point of the resistive elements R22 and R21. The connecting point of the resistive elements R22 and R21 is connected to an inverting input terminal of the operational amplifier 322. A non-inverting input terminal of the operational amplifier 322 is connected to the ground potential. An output terminal of the operational amplifier 322 is connected to a connecting point of the switches 285 and 286.

Figure 12:
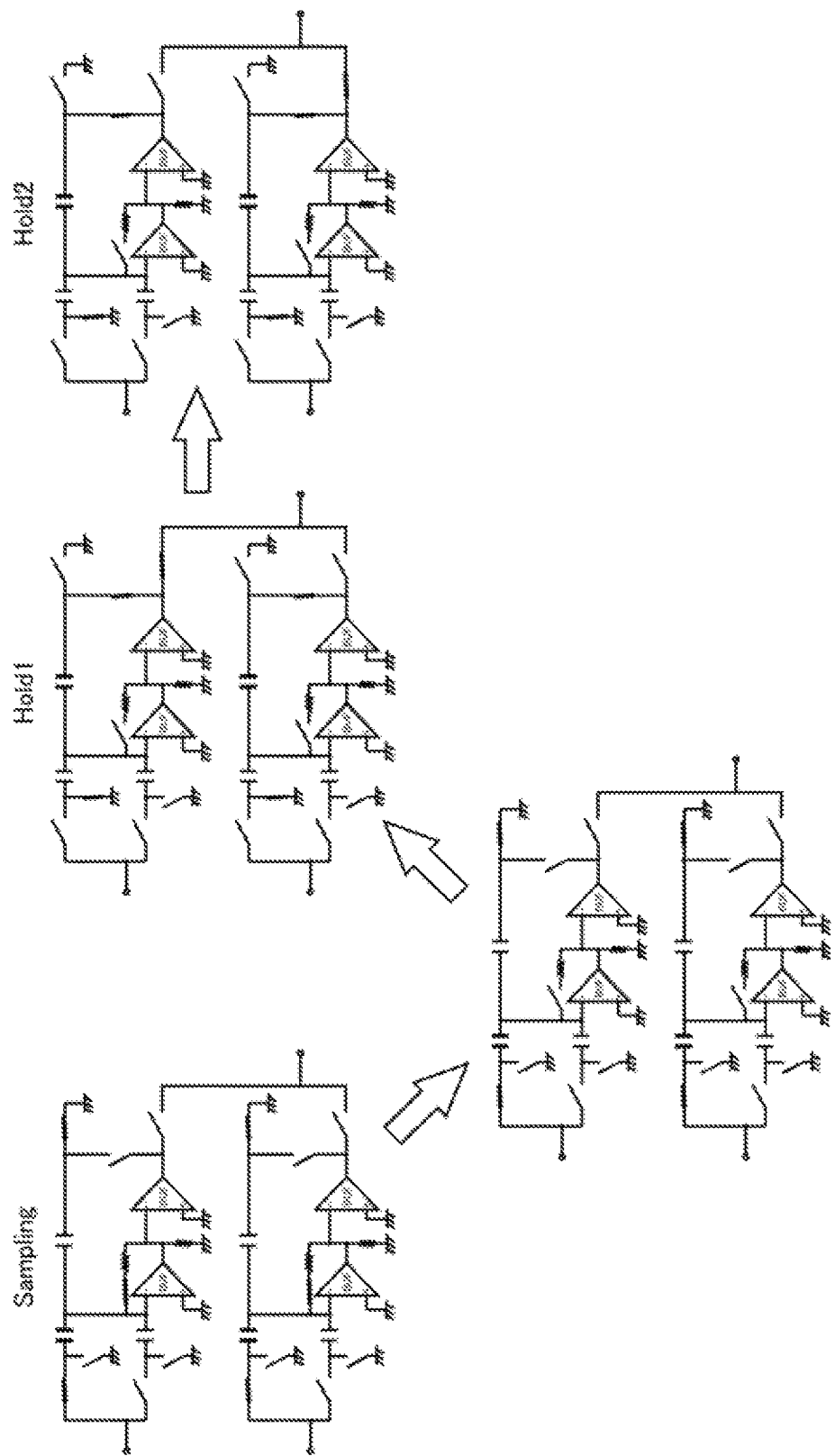
FIG. 12 is a diagram showing an operation of the pipeline buffer circuit in FIG. 11 in AD conversion of a Dark signal.

FIG. 12 is a diagram showing an operation of the pipeline buffer circuit 27 in FIG. 11 in AD conversion of a Dark signal.

With reference to FIG. 11 and FIG. 12 together, in the sampling operation for the Dark signal, the switches 261, 265, 281, 271, 275, and 284 are turned on, and the switches 262 to 264, 282, 283, 272 to 274, 285, and 286 are turned off.

According to the sampling operation for the Dark signal, the voltage of the pixel PIX connected to the vertical signal line VEL1 is held in the capacitive element 266. The voltage of the pixel PIX connected to the vertical signal line VEL2 is held in the capacitive element 276.

Subsequent to the sampling of the Dark signal, the switches 265 and 275 are turned off. At this time, each of a connecting point of the switch 265 and the capacitive element 266 and a connecting point of the switch 275 and the capacitive element 276 generates a noise power Pn that is a kT/C noise (thermal noise).

When the Boltzmann coefficient (J/K) is represented by k, the absolute temperature by T(K), a capacitance value of each of the capacitive elements 266 and 276 by C(F), a resistance value of each of the resistive elements R11 and R21 by $R_1$ ($\Omega$), and a resistance value of each of the resistive elements R12 and R22 by $R_2$ ($\Omega$), the noise power Pn is represented in the following equation (1).

MATHEMATICAL EXPRESSION 1

$$Pn \sim \frac{4}{3} \cdot \frac{kT}{C} \cdot \frac{R_1}{R_2} \quad (1)$$

As indicated in equation (1), the smaller the ratio of the resistance value $R_1$ relative to the resistance value $R_2$, the smaller the noise power Pn. Conversely, the smaller the capacitance value C, the larger the noise power. Hence, decreasing the ratio of the resistance value $R_1$ relative to the resistance value $R_2$ enables the capacitance value C to be decreased, suppressing an increase in the noise power Pn.

After the switches 265 and 275 are turned off, an operation (Hold1) of outputting the voltage of the pixel PIX connected to the vertical signal line VEL1 from the output terminal P13 and an operation (Hold2) of outputting the voltage of the pixel PIX connected to the vertical signal line VEL2 from the output terminal P13 are carried out in this order.

In the operation Hold1, the switches 261, 281, 271, and 284 are turned off, and the switches 262, 272, 282, 283, and 285 are turned on. Since the capacitive elements 266 and 276 are connected to the ground potential, according to the charge conservation, the voltages held in the capacitive elements 266 and 276 are generated in the capacitive elements 268 and 278, respectively. It is only sufficient if the capacitive elements 268 and 278 may have capacitance values required to hold the voltages held in the capacitive elements 266 and 276. Hence, the capacitance values of the capacitive elements 268 and 278 can be made small, as in those of the capacitive elements 266 and 276. By turning the switch 283 on, the voltage of the capacitive element 268 is generated in the output terminal P13.

In the operation Hold2, the switch 283 is turned off, and the switch 286 is turned on, so that the voltage of the capacitive element 278 is generated in the output terminal P13. The sampling operation for the Sig signal is carried out after the operation Hold2 for the Dark signal.

Figure 13:
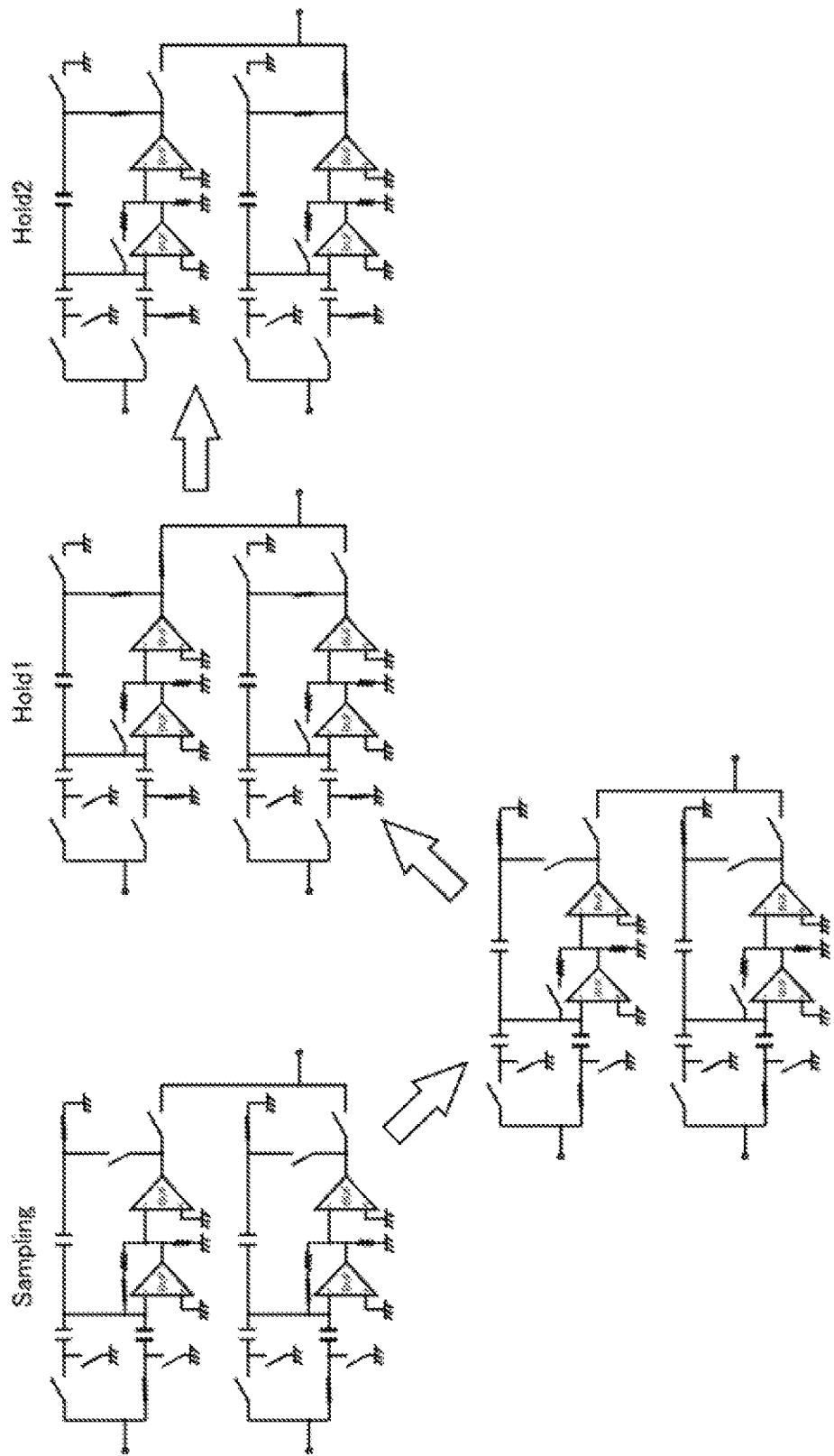
FIG. 13 is a diagram showing an operation of the pipeline buffer circuit in FIG. 11 in AD conversion of a Sig signal.

FIG. 13 is a diagram showing an operation of the pipeline buffer circuit 27 in FIG. 11 in AD conversion of the Sig signal.

With reference to FIG. 11 and FIG. 13 together, in the sampling operation for the Sig signal, the switches 263, 265, 281, 273, 275, and 284 are turned on, and the switches 262, 264, 282, and 285 are turned off. The voltage of the pixel PIX connected to the vertical signal line VEL1 is held in the capacitive element 267. The voltage of the pixel PIX connected to the vertical signal line VEL2 is held in the capacitive element 277.

Subsequent to the sampling of the Sig signal, the switches 265 and 275 are turned off. At this time, at each of a connecting point of the switch 265 and the capacitive element 267 and a connecting point of the switch 275 and the capacitive element 277, the noise power Pn is generated. With the same reason as the capacitive elements 266 and 276, the capacitance value of each of the capacitive elements 267 and 277 can be made small.

After the switches 265 and 275 are turned off, the operation (Hold1) of outputting the voltage of the pixel PIX connected to the vertical signal line VEL1 from the output terminal P13 and the operation (Hold2) of outputting the voltage of the pixel PIX connected to the vertical signal line VEL2 from the output terminal P13 are carried out in this order.

In the operation Hold1, the switches 263, 281, 273, and 284 are turned off, and the switches 264, 274, 282, 283, and 285 are turned on. Since the capacitive elements 267 and 277 are connected to the ground potential, according to the charge conservation, the voltages held in the capacitive elements 267 and 277 are generated in the capacitive elements 268 and 278, respectively. In the Hold2 operation, the switch 283 is turned off, and the switch 286 is turned on.

As described above, according to the solid-state image sensor of the second embodiment, it is possible to achieve higher image quality of a digital image formed of large-scale pixels, maintaining a frame rate of the digital image. More-over, according to the solid-state image sensor of the second embodiment, the capacitance value of the capacitive element included in the pipeline buffer circuit can be made small, so that the solid-state image sensor can be reduced in size.

Third Embodiment

According to the first and the second embodiments, the solid-state image sensor in which two vertical signal lines are provided for each column of the pixel array and the two vertical signal lines are connected to one column ADC has been described. In a third embodiment, a configuration in which one vertical signal line is provided for each column of the pixel array and two vertical signal lines in different columns are connected to one column ADC will be described.

Figure 14:
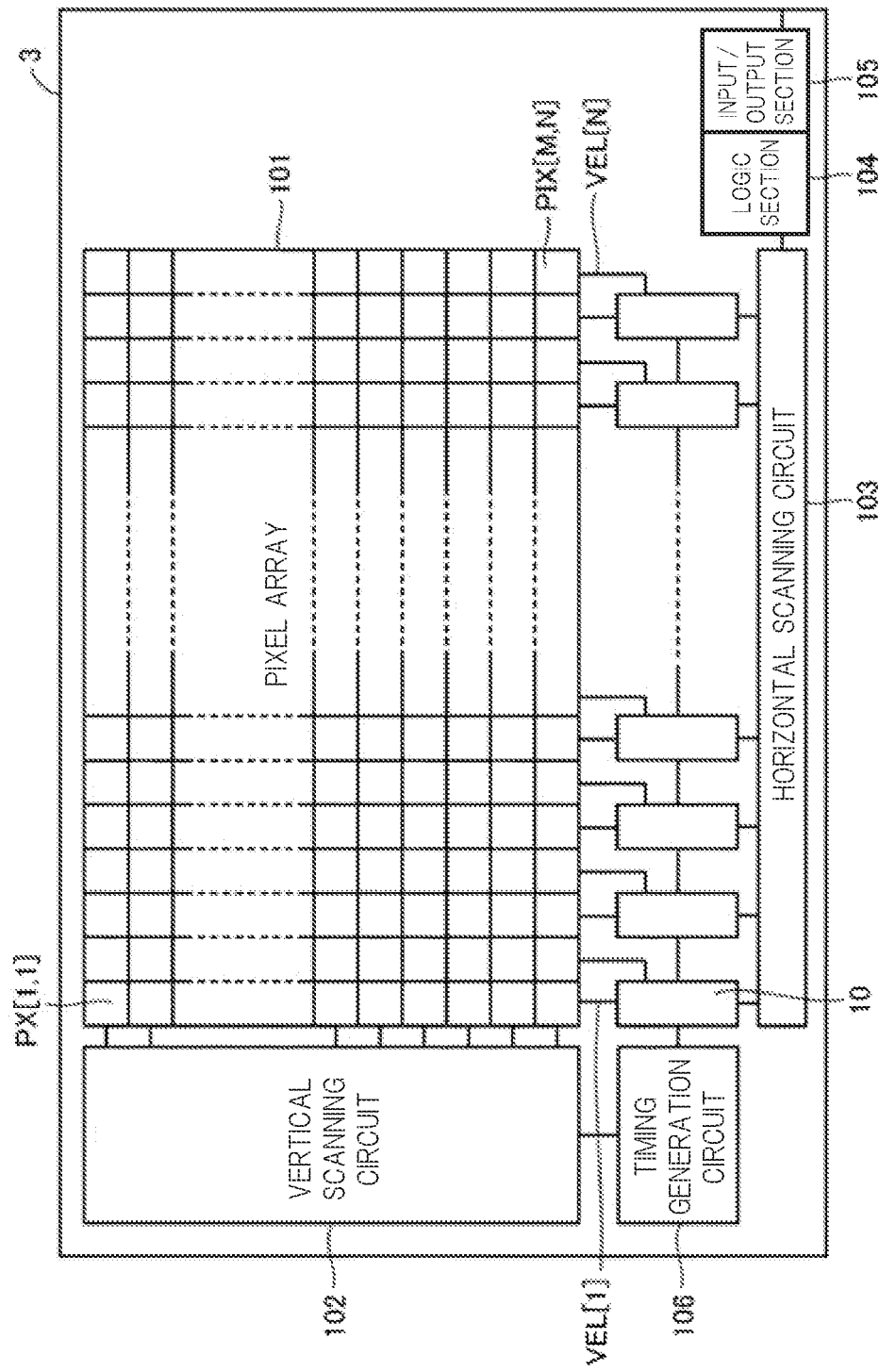
FIG. 14 is a block diagram showing one example of a configuration of a solid-state image sensor according to a third embodiment of the present disclosure.

FIG. 14 is a block diagram showing one example of a configuration of a solid-state image sensor 3 according to the third embodiment of the present disclosure. The configuration of the solid-state image sensor 3 is different from that of the solid-state image sensor 9 in FIG. 4 in that the number of column ADCs 90 of the solid-state image sensor 9 in FIG. 4 is decreased by half. The configuration of other components of the solid-state image sensor 3 is similar to that of the solid-state image sensor 9, and description thereof is omitted.

Figure 15:
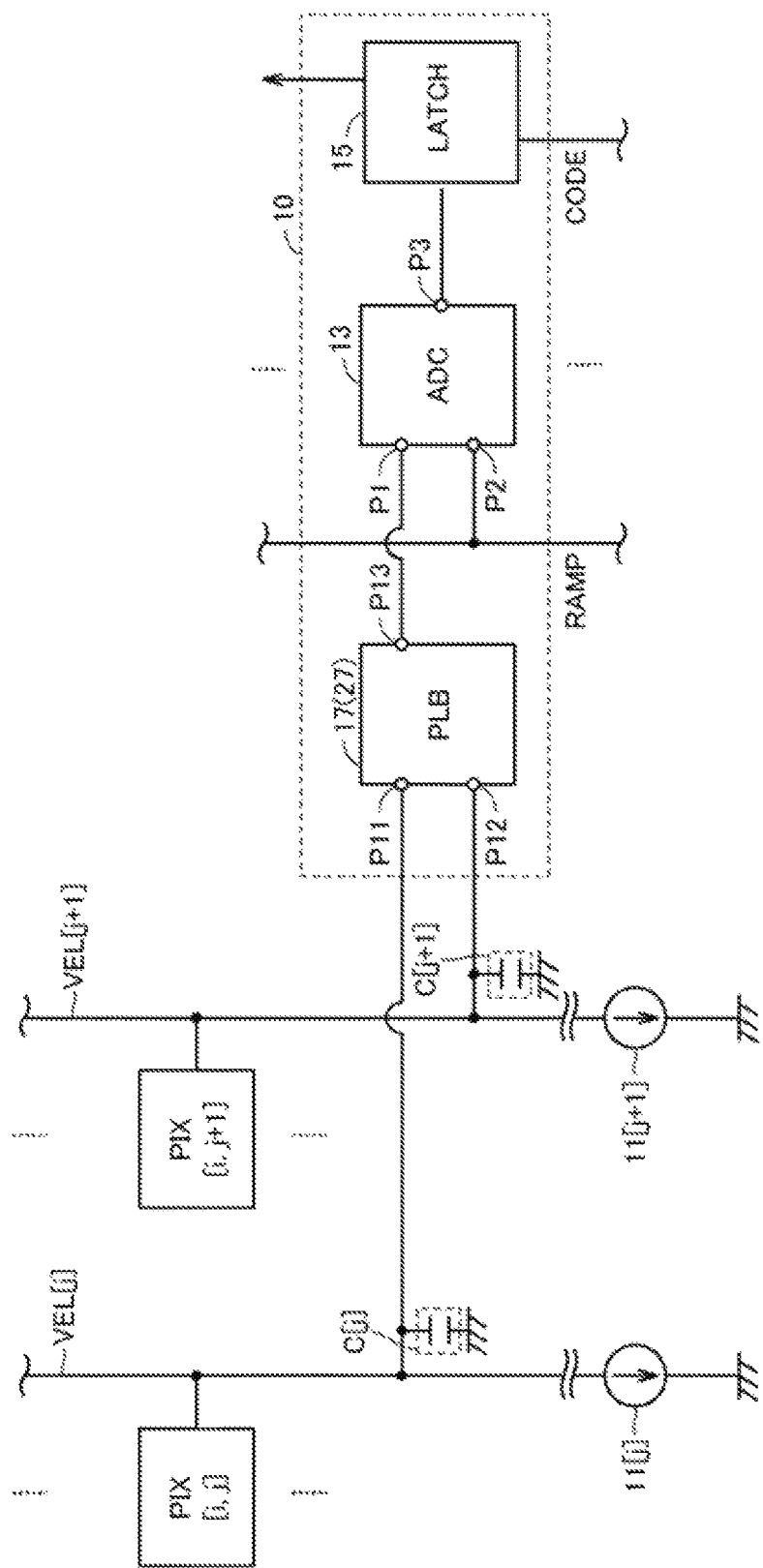
FIG. 15 is a block diagram for describing a connection mode between a column ADC in FIG. 14 and two vertical signal lines.

FIG. 15 is a block diagram for describing a connection mode between a column ADC 10 in FIG. 14 and two vertical signal lines VEL[j] and VEL[j+1]. Note that, in FIG. 15, j is an odd number.

As described in FIG. 15, the vertical signal line VEL[j] in the j-th column of the pixel array 101 is connected to an input terminal P11 of the pipeline buffer circuit 17 (or 27). The vertical signal line VEL[j+1] in the (j+1)-th column of the pixel array 101 is connected to an input terminal P12 of the pipeline buffer circuit 17 (or 27). In the column ADC 10 of the solid-state image sensor 3, sampling operations for voltage signals of pixels PIX[i,j] and PIX[i,j+1] in the i-th row of the pixel array 101 are carried out in parallel with each other.

As described above, according to the solid-state image sensor of the third embodiment, it is possible to achieve higher image quality of a digital image formed of large-scale pixels, maintaining a frame rate of the digital image. Also, according to the solid-state image sensor of the third embodiment, it is possible to decrease the number of column ADCs by half, so that the manufacturing costs of the solid-state image sensor can be reduced.

Fourth Embodiment

In a fourth embodiment, with use of the pipeline buffer circuit described in the first or the second embodiment, a solid-state image sensor capable of enhancing the image quality of a digital image obtained through AD conversion from the Bayer pixel will be described.

Figure 16:
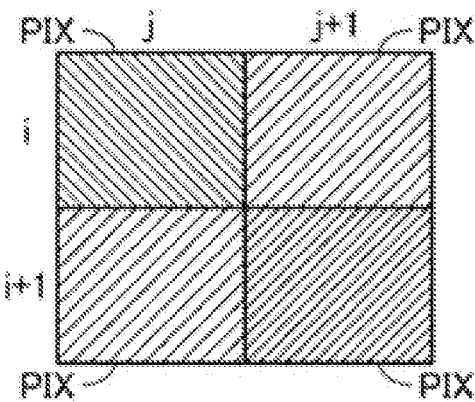
FIG. 16 is a diagram showing one example of a Bayer pixel.

FIG. 16 is a diagram showing one example of a Bayer pixel. As shown in FIG. 16, four pixels PIX[i,j], PIX[i+1,j], PIX[i,j+1], and PIX[i+1,j+1] constitute the Bayer pixel. The pixels PIX[i,j] and PIX[i+1,j+1] store charges corresponding to red light and charges corresponding to blue light, respectively. The pixels PIX[i+1,j] and PIX[i,j+1] each store charges corresponding to green light.

Figure 17:
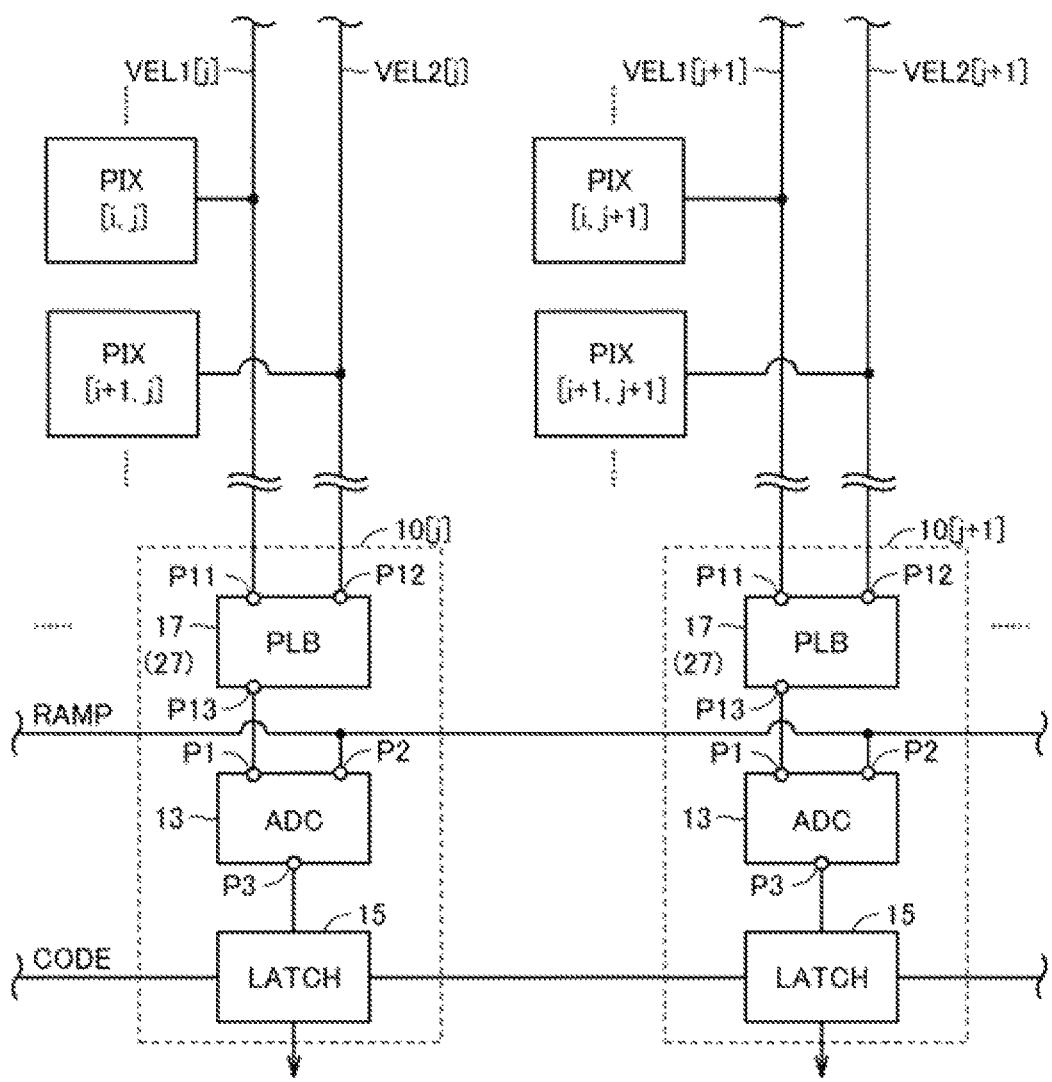
FIG. 17 is a diagram showing a connection configuration between four pixels which constitute a Bayer pixel and two column ADCs in the solid-state image sensor according to the first or the second embodiment.

FIG. 17 is a diagram showing a connection configuration between four pixels PIX[i,j], PIX[i+1,j], PIX[i,j+1], and PIX[i+1,j+1] which constitute a Bayer pixel and two column ADCs 10[j] and 10[j+1] in the solid-state image sensor according to the first or the second embodiment.

As shown in FIG. 17, voltage signals from the pixel PIX[i,j] corresponding to red light and the pixel PIX[i+1,j] corresponding to green light are input to the column ADC 10[j] through the vertical signal lines VEL1[j] and VEL2[j], respectively.

Voltage signals from the pixel PIX[i,j+1] corresponding to green light and the pixel PIX[i+1,j+1] corresponding to blue light are input to the column ADC 10[j+1] through the vertical signal lines VEL1[j+1] and VEL2[j+1], respectively.

Figure 18:
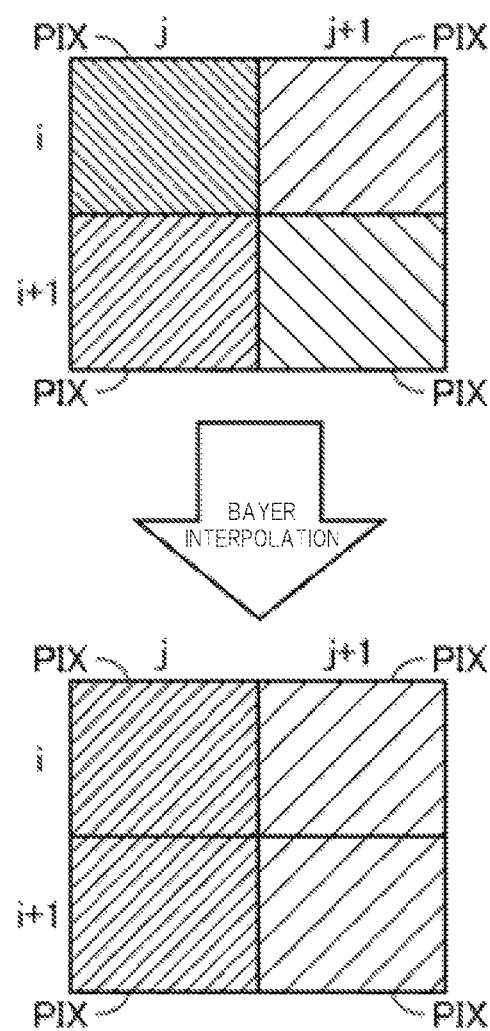
FIG. 18 is a diagram showing one example of a result of AD conversion of the Bayer pixel in FIG. 16, in a case in which one of the conversion results of the two column ADCs in FIG. 17 has an error.

FIG. 18 is a diagram showing one example of a result of AD conversion of the Bayer pixel in FIG. 16, in a case in which one of the conversion results of the two column ADCs 10[j] and 10[j+1] in FIG. 17 has an error. In FIG. 18, a case in which the conversion result of the pixel converted by the column ADC 10[j+1] is brighter than usual is shown.

As shown in FIG. 18, comparing the conversion result of the pixel PIX[i+1,j] with the conversion result of the pixel PIX[i,j+1], the conversion result of the pixel PIX[i,j+1] converted by the column ADC 10[j+1] is brighter than the conversion result of the pixel PIX[i+1,j] converted by the column ADC 10[j]. As a result, when a Bayer interpolation process is carried out on the conversion result of the Bayer pixel, the pixel in the (j+1)-th column is brighter than that in the j-th column.

In this manner, when the voltage signals of two pixels included in the same column for each column of the Bayer pixel are converted by the same column ADC 10, in a case in which one of the two column ADCs 10 has an error, a column having different brightness from the other columns occurs in the digital image output from the solid-state image sensor in the first or the second embodiment.

In view of this, in the solid-state image sensor of the fourth embodiment, the column ADC 10 to which the voltage signal from the pixel is input is made different for not each column, but each pixel color.

Figure 19:
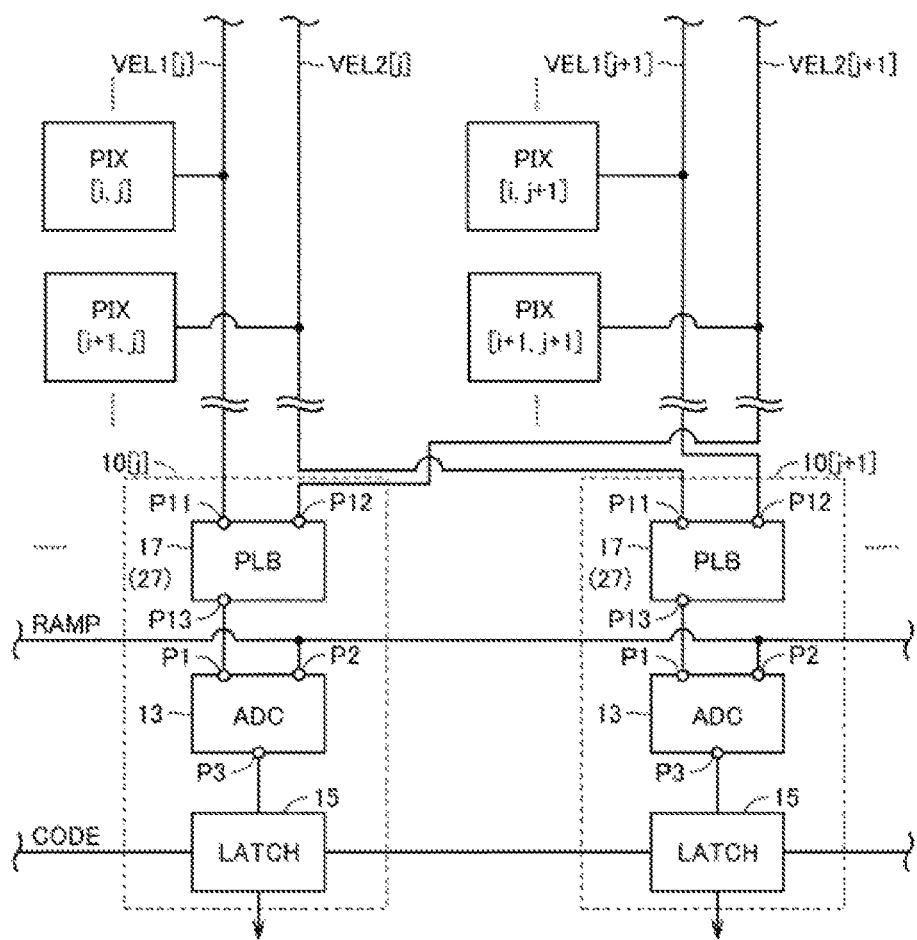
FIG. 19 is a diagram showing a connection configuration between four pixels which constitute a Bayer pixel and two column ADCs in a solid-state image sensor according to a fourth embodiment of the present disclosure.

FIG. 19 is a diagram showing a connection configuration between four pixels PIX[i,j], PIX[i+1,j], PIX[i,j+1], and PIX[i+1,j+1] which constitute a Bayer pixel and two column ADCs 10[j] and 10[j+1] in a solid-state image sensor according to the fourth embodiment of the present disclosure.

As shown in FIG. 19, the voltage signal from the pixel PIX[i,j] corresponding to red light and the voltage signal from the pixel PIX[i+1,j+1] corresponding to blue light are input to the column ADC 10[j] through the vertical signal lines VEL1[j] and VEL2[j+1], respectively.

The voltage signal from the pixel PIX[i+1,j] corresponding to green light and the voltage signal from the pixel PIX[i,j+1] corresponding to green light are input to the column ADC 10[j+1] through the vertical signal lines VEL2[j] and VEL1[j+1], respectively.

Figure 20:
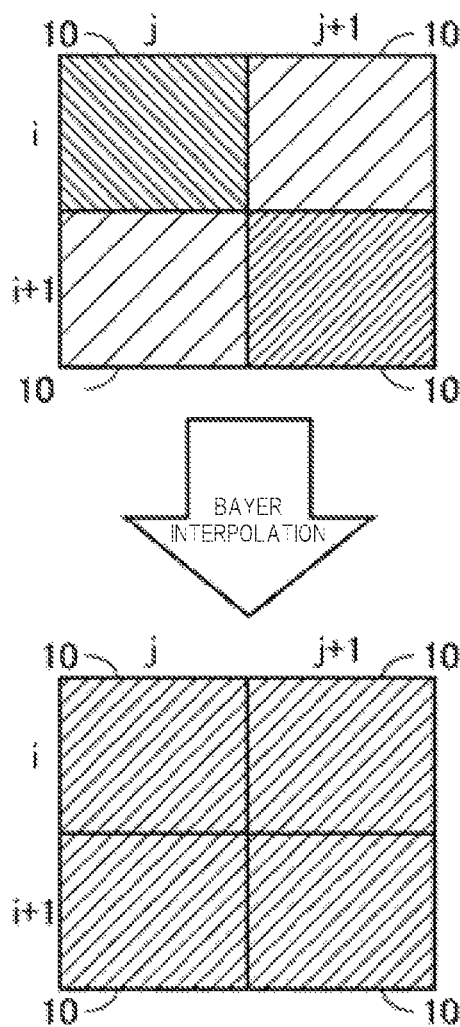
FIG. 20 is a diagram showing a result of the AD conversion of the Bayer pixel in FIG. 16, in a case in which one of the conversion results of the two column ADCs in FIG. 19 has an error.

FIG. 20 is a diagram showing a result of the AD conversion of the Bayer pixel in FIG. 16, in a case in which one of the conversion results of the two column ADCs 10[j] and 10[j+1] in FIG. 19 has an error.

As shown in FIG. 20, the voltage signal from the pixel PIX[i+1,j] corresponding to green light and the voltage signal from the pixel PIX[i,j+1] corresponding to green light are converted by the same column ADC 10[j+1], and accordingly, brightness of conversion results of both of the pixels PIX[i+1,j] and PIX[i,j+1] are the same with each other. Hence, in the digital image output from the solid-state image sensor of the fourth embodiment, a column having different brightness from the other columns does not occur.

As described above, according to the solid-state image sensor of the fourth embodiment, it is possible to achieve higher image quality of a digital image formed of large-scale pixels, maintaining a frame rate of the digital image. In addition, according to the solid-state image sensor of the fourth embodiment, it is possible to enhance the image quality of the digital image obtained by performing AD conversion on the Bayer pixel.

In the foregoing, the invention made by the inventor of the present invention has been specifically described based on the embodiments. However, it is needless to say that the present invention is not limited to the foregoing embodiments and various modifications and alterations can be made within the gist of the present invention.

What is claimed is:

1. A solid-state image sensor which converts voltages of a plurality of pixels storing charges corresponding to an amount of incident light by photoelectric conversion to output a digital image, the solid-state image sensor comprising:
   a first buffer circuit connected to a first pixel and a second pixel of the plurality of pixels; and
   a first analog-to-digital conversion circuit converting a voltage signal from the first buffer circuit into a digital signal,
   wherein the first buffer circuit includes
      a first voltage holding circuit connected to the first pixel,
      a second voltage holding circuit connected to the second pixel, and
      a first switch circuit selectively switching a voltage holding circuit which outputs a voltage signal to the first analog-to-digital conversion circuit between the first voltage holding circuit and the second voltage holding circuit,
   wherein the first buffer circuit carries out an operation of holding a voltage signal of the first pixel in the first voltage holding circuit and an operation of holding a voltage signal of the second pixel in the second voltage holding circuit in parallel with each other,
   wherein each of the first voltage holding circuit and the second voltage holding circuit includes
      a capacitive element to which the voltage signal of the pixel connected to each of the voltage holding circuits is input,
      a first resistive element,
      a second resistive element, and
      a switch,
   wherein the switch, the second resistive element, and the first resistive element are connected in series between the capacitive element and a ground potential, in this order,
   wherein each of the first voltage holding circuit and the second voltage holding circuit carries out a first operation of holding the voltage signal from the pixel connected to the voltage holding circuit in the capacitive element and a second operation of outputting the voltage held in the capacitive element by the first operation to the first analog-to-digital conversion circuit,
   wherein, in the first operation, the switch is turned on such that the capacitive element and the second resistive element are in a conductive state, and
   wherein, after the first operation and before the second operation, the switch is turned off such that the capacitive element and the second resistive element are in a non-conductive state.

2. The solid-state image sensor according to claim 1,
wherein the plurality of pixels form a pixel array having a plurality of rows and a plurality of columns,
wherein the first pixel and the second pixel are included in a same column of the plurality of columns, and
wherein each of the plurality of pixels included in the same column is connected to the first voltage holding circuit or the second voltage holding circuit.

3. The solid-state image sensor according to claim 1,
wherein the plurality of pixels forms a pixel array having a plurality of rows and a plurality of columns,
wherein the first pixel and the second pixel are included in a same row of the plurality of rows, and are respectively included in a first column and a second column of the plurality of columns,
wherein the pixel included in the first column is connected to the first voltage holding circuit, and
wherein the pixel included in the second column is connected to the second voltage holding circuit.

4. The solid-state image sensor according to claim 1,
wherein the plurality of pixels form a pixel array having a plurality of rows and a plurality of columns, and further include a third pixel and a fourth pixel,
wherein the first pixel and the third pixel are included in a first column of the plurality of columns,
wherein the second pixel and the fourth pixel are included in a second column of the plurality of columns,
wherein the first pixel and the fourth pixel are included in a first row of the plurality of rows,
wherein the second pixel and the third pixel are included in a second row of the plurality of rows,
wherein the first column and the second column are adjacent to each other,
wherein the first row and the second row are adjacent to each other,
wherein the first pixel, the second pixel, the third pixel, and the fourth pixel form a Bayer pixel,
wherein the first pixel and the second pixel stores charges corresponding to red light and charges corresponding to blue light, respectively,
wherein each of the third pixel and the fourth pixel stores charges corresponding to green light,
wherein the solid-state image sensor further includes
a second buffer circuit connected to the third pixel and the fourth pixel, and
a second analog-to-digital conversion circuit converting a voltage signal from the second buffer circuit into a digital signal,
wherein the second buffer circuit includes
a third voltage holding circuit connected to the third pixel,
a fourth voltage holding circuit connected to the fourth pixel, and
a second switch circuit selectively switching a voltage holding circuit which outputs a voltage signal to the second analog-to-digital conversion circuit between the third voltage holding circuit and the fourth voltage holding circuit, and
wherein the second buffer circuit carries out an operation of holding a voltage signal of the third pixel in the third voltage holding circuit and an operation of holding a voltage signal of the fourth pixel in the fourth voltage holding circuit in parallel with each other.

5. An imaging device comprising:
a lens module causing incident light to pass therethrough; and
a solid-state image sensor which converts voltages of a plurality of pixels storing charges corresponding to an amount of the incident light by photoelectric conversion to output a digital image,
wherein the solid-state image sensor includes
a first buffer circuit connected to a first pixel and a second pixel of the plurality of pixels, and
a first analog-to-digital conversion circuit converting a voltage signal from the first buffer circuit into a digital signal,
wherein the first buffer circuit includes
a first voltage holding circuit connected to the first pixel,
a second voltage holding circuit connected to the second pixel, and
a first switch circuit selectively switching a voltage holding circuit which outputs a voltage signal to the first analog-to-digital conversion circuit between the first voltage holding circuit and the second voltage holding circuit,
wherein the first buffer circuit carries out an operation of holding a voltage signal of the first pixel in the first voltage holding circuit and an operation of holding a voltage signal of the second pixel in the second voltage holding circuit in parallel with each other,
wherein each of the first voltage holding circuit and the second voltage holding circuit includes
a capacitive element to which the voltage signal of the pixel connected to each of the voltage holding circuits is input,
a first resistive element,
a second resistive element, and
a switch,
wherein the switch, the second resistive element, and the first resistive element are connected in series between the capacitive element and a ground potential, in this order,
wherein each of the first voltage holding circuit and the second voltage holding circuit carries out a first operation of holding the voltage signal from the pixel connected to the voltage holding circuit in the capacitive element and a second operation of outputting the voltage held in the capacitive element by the first operation to the first analog-to-digital conversion circuit,
wherein, in the first operation, the switch is turned on such that the capacitive element and the second resistive element are in a conductive state, and
wherein, after the first operation and before the second operation, the switch is turned off such that the capacitive element and the second resistive element are in a non-conductive state.

6. The imaging device according to claim 5,
wherein the plurality of pixels form a pixel array having a plurality of rows and a plurality of columns,
wherein the first pixel and the second pixel are included in a same column of the plurality of columns, and
wherein each of the plurality of pixels included in the same column is connected to the first voltage holding circuit or the second voltage holding circuit.

7. The imaging device according to claim 5,
wherein the plurality of pixels forms a pixel array having a plurality of rows and a plurality of columns,
wherein the first pixel and the second pixel are included in a same row of the plurality of rows, and are respectively included in a first column and a second column of the plurality of columns, wherein the pixel included in the first column is connected to the first voltage holding circuit, and wherein the pixel included in the second column is connected to the second voltage holding circuit.

8. The imaging device according to claim 5, wherein the plurality of pixels form a pixel array having a plurality of rows and a plurality of columns, and further include a third pixel and a fourth pixel, wherein the first pixel and the third pixel are included in a first column of the plurality of columns, wherein the second pixel and the fourth pixel are included in a second column of the plurality of columns, wherein the first pixel and the fourth pixel are included in a first row of the plurality of rows, wherein the second pixel and the third pixel are included in a second row of the plurality of rows, wherein the first column and the second column are adjacent to each other, wherein the first row and the second row are adjacent to each other, wherein the first pixel, the second pixel, the third pixel, and the fourth pixel form a Bayer pixel, wherein the first pixel and the second pixel stores charges corresponding to red light and charges corresponding to blue light, respectively, wherein each of the third pixel and the fourth pixel stores charges corresponding to green light, wherein the solid-state image sensor further includes
  a second buffer circuit connected to the third pixel and the fourth pixel, and
  a second analog-to-digital conversion circuit converting a voltage signal from the second buffer circuit into a digital signal, wherein the second buffer circuit includes
  a third voltage holding circuit connected to the third pixel,
  a fourth voltage holding circuit connected to the fourth pixel, and
  a second switch circuit selectively switching a voltage holding circuit which outputs a voltage signal to the second analog-to-digital conversion circuit between the third voltage holding circuit and the fourth voltage holding circuit, and wherein the second buffer circuit carries out an operation of holding the voltage signal of the third pixel in the third voltage holding circuit and an operation of holding the voltage signal of the fourth pixel in the fourth voltage holding circuit in parallel with each other.

9. An analog-to-digital converter converting a voltage signal to output a digital signal, the analog-to-digital converter comprising:

a buffer circuit to which a first voltage signal and a second voltage signal are input; and an analog-to-digital conversion circuit converting a voltage signal from the buffer circuit into a digital signal, wherein the buffer circuit includes
  a first terminal to which the first voltage signal is input,
  a second terminal to which the second voltage signal is input,
  a first voltage holding circuit connected to the first terminal,
  a second voltage holding circuit connected to the second terminal, and
  a first switch circuit selectively switching a voltage holding circuit which outputs a voltage signal to the analog-to-digital conversion circuit between the first voltage holding circuit and the second voltage holding circuit, wherein the buffer circuit carries out an operation of holding the first voltage signal in the first voltage holding circuit and an operation of holding the second voltage signal in the second voltage holding circuit in parallel with each other, wherein each of the first voltage holding circuit and the second voltage holding circuit includes
  a capacitive element to which a voltage signal from one of the first terminal and the second terminal connected to the corresponding voltage holding circuit is input,
  a first resistive element,
  a second resistive element, and
  a switch, wherein the switch, the second resistive element, and the first resistive element are connected in series between the capacitive element and a ground potential, in this order, wherein each of the first voltage holding circuit and the second voltage holding circuit carries out a first operation of holding a voltage signal from a pixel connected to the voltage holding circuit in the capacitive element and a second operation of outputting the voltage held in the capacitive element by the first operation to the analog-to-digital conversion circuit, wherein, in the first operation, the switch is turned on such that the capacitive element and the second resistive element are in a conductive state, and wherein, after the first operation and before the second operation, the switch is turned off such that the capacitive element and the second resistive element are in a non-conductive state.

\* \* \* \* \*